BANKED MEMORY SYSTEM

Filed Oct. 27, 1964 22 Sheets-Sheet 1

INVENTORS.
RICHARD C. RICHMOND,
THOMAS A. CONNOLLY,
BY Walter J. Adam
ATTORNEY.

BANKED MEMORY SYSTEM

Filed Oct. 27, 1964 22 Sheets-Sheet 2

Sept. 19, 1967 R. C. RICHMOND ET AL 3,343,140

BANKED MEMORY SYSTEM

Filed Oct. 27, 1964 22 Sheets-Sheet 14

Sept. 19, 1967 R. C. RICHMOND ET AL 3,343,140

BANKED MEMORY SYSTEM

Filed Oct. 27, 1964 22 Sheets-Sheet 16

Sept. 19, 1967 R. C. RICHMOND ET AL 3,343,140

BANKED MEMORY SYSTEM

Filed Oct. 27, 1964 22 Sheets-Sheet 17

| EAU | X01 | X02 | PHA | E101 | E102 | PHY |
|---|---|---|---|---|---|---|
| - | 0 | 0 | 0 | 0 | 0 | 00 |
| 0 | 1 | 0 | 0 | 1 | 0 | 01 |
| 0 | 1 | 0 | 0 | 0 | 1 | 02 |
| 0 | 1 | 0 | 0 | 1 | 1 | 03 |
| 0 | 1 | 0 | 0 | 0 | 0 | 00 |
| 1 | 1 | 0 | 1 | 1 | 0 | 01 |
| 1 | 0 | 1 | 2 | 0 | 1 | 02 |
| 1 | 1 | 1 | 3 | 1 | 1 | 03 |
| 1 | 0 | 0 | 0 | 0 | 0 | 00 |

INPUT-OUTPUT CYCLE (rows 2–5)

AU CYCLE (rows 6–9)

BANKED MEMORY SYSTEM

Sept. 19, 1967 R. C. RICHMOND ET AL 3,343,140

BANKED MEMORY SYSTEM

Filed Oct. 27, 1964 22 Sheets-Sheet 22

3,343,140

BANKED MEMORY SYSTEM

Richard C. Richmond, Orange, and Thomas A. Connolly, Hacienda Heights, Calif., assignors to Hughes Aircraft Company, Culver City, Calif., a corporation of Delaware Filed Oct. 27, 1964, Ser. No. 406,783
4 Claims. (Cl. 340—172.5)

ABSTRACT OF THE DISCLOSURE

A banked memory system comprising a plurality of independently operating memory banks each having its own data and address registers, selection network and control network. Address data and control buses are connected to each of the plurality of banks to apply address, data and control signals in common to all banks from a plurality of independently operating sources such as an arithmetic unit and input-output units. Each memory bank processes memory requests with a predetermined priority and provides feedback signals to the lower priority requesting units when several sources request access of the same bank.

This invention relates to digital computer systems and particularly to a memory system that allows simultaneous access to memory from a plurality of independent sources.

Digital computers conventionally include an internal magnetic storage memory which is addressed through an address register to read-out stored words into a data register or to write new information from the data register into a selected word position. The memory may be addressed and controlled in response to different sources such as the computer arithmetic unit or external devices. With a single memory system, a conventional computer is unable to simultaneously perform a plurality of functions because the memory may be controlled and utilized by only a single source at one time. To include a plurality of separate memories in a computer requires an undesired number of control circuits and programs in order to reliably access the proper memories at the proper times. If a large number of memories are utilized each capable of being accessed from a plurality of sources, the amount of complex control circuits required for each source to know the state of the other sources becomes excessive. Furthermore, when utilizing a large number of separate memories in a conventional arrangement, an excessive amount of logical structure is required to transfer separate addresses to the plurality of memories. Also, in a real time system in which information is periodically transferred to the memory from external devices, computer programming preferably requires that new data be stored in a common memory system.

It is therefore an object of this invention to provide a computer memory system that has the desirable characteristics of both a single memory system and of a plurality of separate memory systems.

It is another object of this invention to provide a banked memory system that provides simultaneous access to memory from a plurality of different areas.

It is still another object of this invention to provide a memory system including a plurality of modules or banks, different ones of which may be simultaneously accessed from a plurality of sources and which allows access of the same bank from the different sources with predetermined priority.

It is a further object of this invention to provide a memory system that inhibits the computer operation when memory is accessed by a source having a greater priority.

It is a still further object of this invention to provide a computer system in which a plurality of sources access the memory substantially independently of each other.

It is a further object of this invention to provide a memory system which maintains control of a plurality of sources that access the memory substantially independently of each other.

It is a further object of this invention to provide a memory system including a plurality of substantially independent memory banks that respond to a common addressing arrangement.

It is a further object of this invention to provide a highly reliable banked memory system including a plurality of modules that allows a computer to operate while any particular module is being repaired.

Briefly, the banked computer memory system in accordance with the principles of the invention includes a plurality of independently operating memory modules or banks each having an address register, a data register, a bank selection network, a data selection network, a control circuit and a feedback network. The memory system may operate in response to a plurality of independently operating sources such as the arithmetic unit of the computer and the input-output unit or external devices. Also, the system may respond to an external function request of the arithmetic unit to provide information to the input-output unit. The selection network of each bank is responsive to arithmetic unit address buses, input-output unit buses, arithmetic request buses and input-output request buses, each common to the plurality of memory banks. A bank identifier portion of the addresses are applied to the selection networks which control transfer of the common memory address to the address register of a selected bank. The selection network separates and processes the memory requests with a selected priority which may provide the input-output unit priority over the arithmetic unit and the external function request priority over the other types of requests. The data register in each bank is selectively coupled through the data selection network to common data buses for transferring information from the arithemetic unit and from the input-output unit to the address registers and for transferring information to the arithmetic unit and to the input-output unit from the address registers. The control network of each bank includes a memory phase counter that is normally maintained in phase with an arithmetic unit phase counter that is utilized to control the steps of computer operation. The feedback network in each memory bank applies signals to the arithmetic unit phase counter to inhibit that phase counter and in turn suspend computer operation whenever a higher priority unit is accessing the same bank as requested by the arithmetic unit. In response to a higher priority request from the input-output unit, a current memory cycle requested by the arithmetic unit is completed before the input-output unit accesses that memory bank for a desired number of memory cycles. When the arithmetic unit and the input-output request different memory banks, each operates substantially independently of each other so that simultaneous access to memory is performed from a plurality of different sources.

The novel features of this invention, as well as the invention itself, both as to its organization and method of operation, will best be understood from the accompanying description taken in connection with the accompanying drawings in which like characters refer to like parts, and in which.

Figure 1:
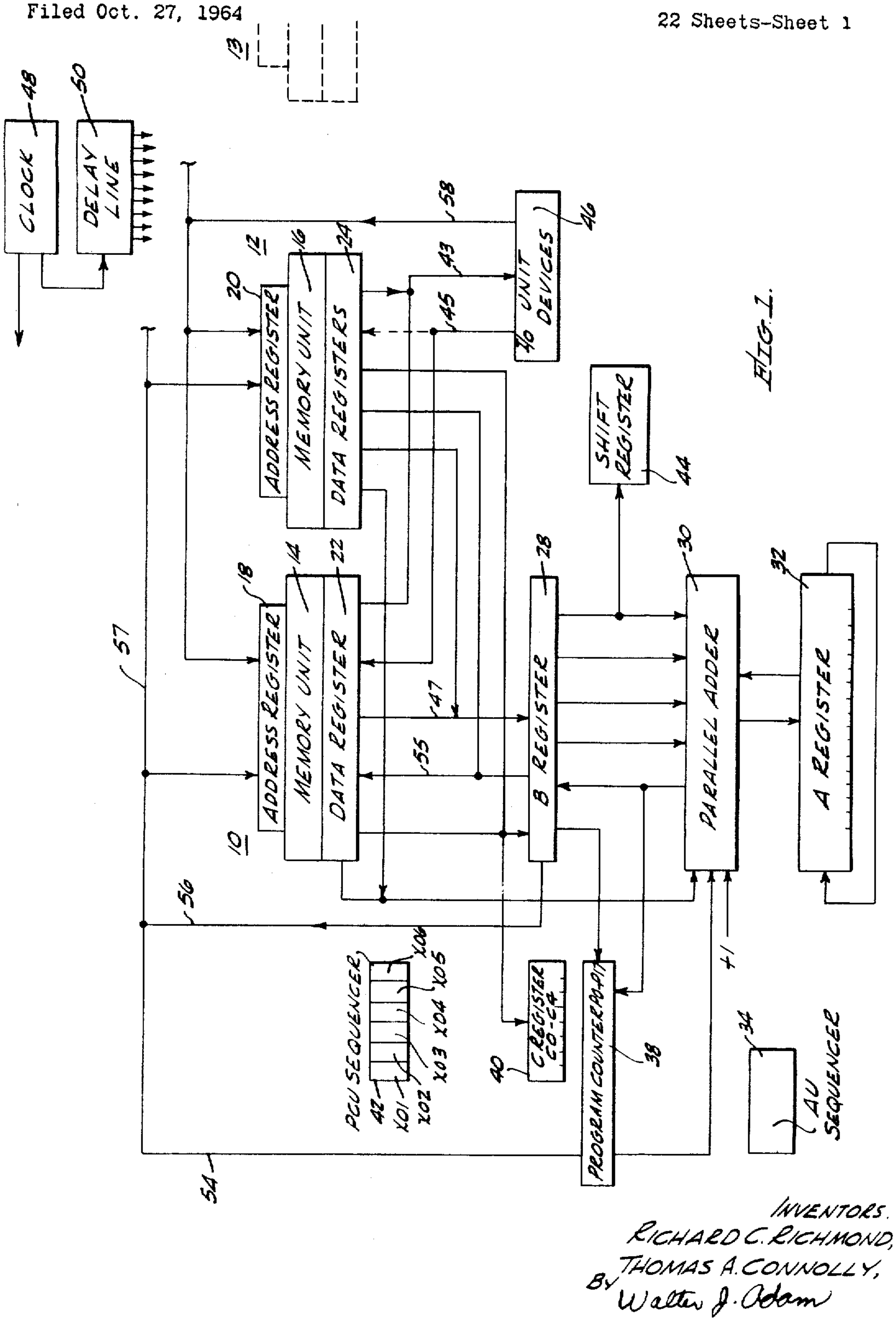
FIG. 1 is a schematic block diagram of the banked memory system in accordance with the principles of the invention operating in a digital computer.

Referring first to FIG. 1, the bank memory system in accordance with the principles of the invention includes memory banks or modules 10 and 12 which may include magnetic memory array units 14 and 16 storing information in magnetic cores, thin films, magnetic wires or other suitable storage arrangements. It is to be noted that although the principles of the invention are applicable to any desired number of banks, only banks 10 and 12 are illustrated for convenience of explanation and additional banks may be included as indicated by a dotted bank 13. Also applicable to the principles of the invention are any type of memory that may be utilized in computer systems. As is well known in the art, the memory array units 14 and 16 may have a plurality of cells or word positions at which either instruction words, external command words or data words are stored as binary states, for example. Address registers 18 and 20 temporarily store and apply binary word addresses to the respective memory arrays 14 and 16, and data registers 22 and 24 temporarily store binary information which is either read from or is to be stored in the respective memory arrays 14 and 16. The computer system may include a buffer or B register 28, an adder 30 which may be a parallel adder for example, and an accumulator or A register 32. An AU or arithmetic unit sequencer 34 may be associated with the arithmetic unit which includes the registers 28 and 32 and the adder 30. The AU sequencer 34 develops timing or logical control signals for performing sequences of operation, as are well known in the art. The program control unit, which for purposes of explanation of the memory system of the invention may be considered to be part of the arithmetic unit, may include a program counter 38, a command or C register 40 and a PCU or program control unit sequencer 42. The PCU sequencer 42 may include a program control unit phase counter provided by flip flops X01 and X02 and may include a program control unit level controller formed by flip flops X03 to X06. The program counter 38 may include flip flops P0 to P17, for example. A shift register counter 44 may be provided to store digital values which may be obtained from an instruction, to determine the number of iterations or arithmetic operations to be performed. An input-output unit 46 may supply new data registers 22 and 24 or receive data therefrom. It is to be understood that the input-output unit 46 may include suitable interface equipment and external devices such as magnetic tape units, punched tape units or magnetic disc units, for example. The system includes a clock 48 which in turn is coupled to a tapped delay line 50 for providing timing control pulses during the intervals between clock pulses. The clock 48 may include a master oscillator and suitable pulse forming circuits as are well known in the art. Power may be supplied to the computer system and the memory system from a conventional power supply (not shown) which applies regulated DC voltage to the memory and to registers and other elements of the system. It is to be again noted that although the program control unit of FIG. 1 is described separate from the arithmetic unit, the two units will be generally considered as the arithmetic unit for the purposes of this invention as the program control unit generally provides controls for the arithmetic operations.

The computer system of FIG. 1 operates to access a selected memory bank such as 10 or 12 from an address supplied either from the arithmetic unit which is considered to include the program control unit, or from the input-output unit 46 which may include any number of external devices such as a magnetic or paper tape unit or a source of signals such as a radar or communication system. The arithmetic unit may access the memory by supplying an address from the program counter 38 on a composite lead 54 or from the B register 28 on a composite lead 56, for example, and the input-output (*I/O*) unit accesses the memory by supplying an address on a composite lead 58. Data is supplied to the data registers 22 and 24 from the input-output unit on a composite lead 45 and is received by the input-output unit on a composite lead 43. As will be explained subsequently, the addresses provided by the arithmetic unit and the input-output unit have a portion that is common to all memory banks and a bank selector portion that provides selection of a particular memory bank. The computer operating in a conventional manner, derives instructions from memory banks 10 or 12 at the address retained in the program counter 38 in response to control signals developed by the PCU sequencer 42. The instruction word is then transferred from the selected data register 22 or 24 through the leads of a bus 47 into the B register 28 and the C register 40, with an address of an operand being transferred to the B register 28. Certain bits of the instruction word may form the operating code and certain bits may form the operand address, as is well known in the art. The operand address, which may be modified, is then transferred from the B register on the composite lead 56 to a selected address register 18 or 20 and an operand or data word is then transferred to the B register 28 on the leads of the bus 47 in response to the PCU sequencer 38 responding to the contents of the C register 40. For an external function request by the arithmetic unit, a command word is transferred to the input-output unit 46 on a lead 43 from the address provided by the arithmetic unit. The function of the program counter 38 is to retain the address of the next instruction to be accessed so the contents thereof are incremented by one, such as being passed through the adder 30 after each instruction word is accessed. Data may be transferred from the arithmetic unit to the banks 10 and 12 on the leads of a bus 55. The PCU sequencer 38 develops control signals properly sequenced and timed with the clock 48 to perform the accessing of an instruction and the accessing of an operand from memory, as well as to control other computer operations. As is well known in the art, each of the storage and control registers includes flip flops with proper gating to respond to binary information signals, to timing signals and to control signals.

The next operation in the execution of the instruction such as an arithmetic instruction, is to perform an arithmetic operation on the operand in the B register 28 principally under the control of the AU sequencer 34. The instruction code stored in the C register 40 may control the AU sequencer 34. The partial result may be stored in the A register 32 while the next instruction is derived from memory in response to the address in the program counter 38. The operation of a digital computer to perform sequential steps and perform arithmetic and other operations is well known in the art.

Figure 2:
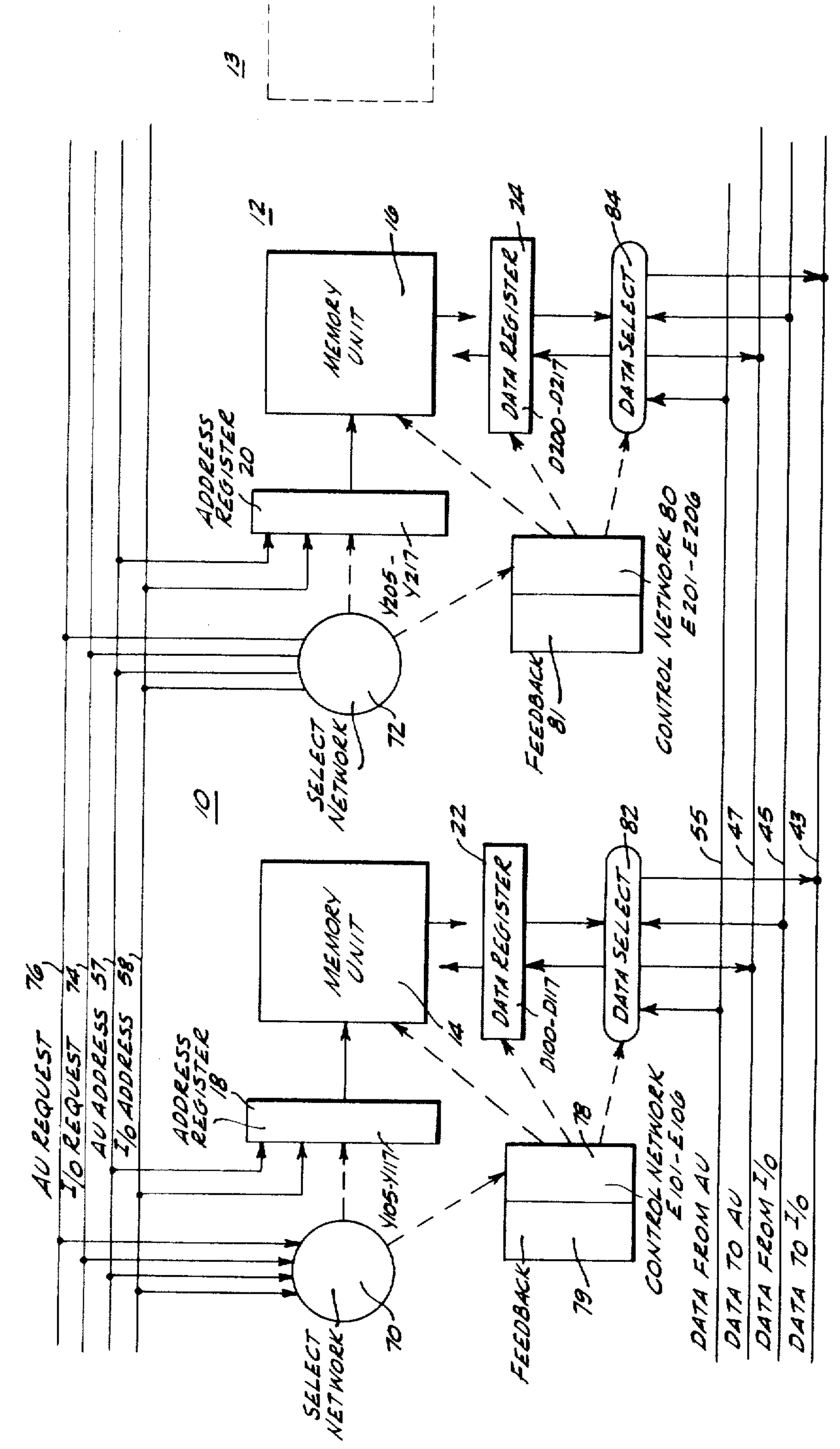
FIG. 2 is a schematic block diagram showing the banked memory system of FIG. 1 in further detail.

Referring now to FIG. 2 which shows the memory banks in further detail, the address registers 18 and 20 of the respective banks 10 and 12 may both receive, after proper gating, 13 bits of address, for example, from the AU address bus 57 and the *I/O* address bus 58, which buses are composite leads as will be explained subsequently. Selection or select networks 70 and 72 of respective banks 10 and 12 are each coupled to the AU address bus 57, the *I/O* bus 58, an *I/O* request bus 74 and an AU request bus 76. The selection networks 70 and 72 may respond to one bit of a 14 bit address for a two bank system or to two bits of a complete 15 bit address word for a three or four bank system, to energize the corresponding address register and to provide a priority to the requests. It is to be noted that depending on the number of additional memory banks that are utilized such as bank 13, any number of bits may be utilized for application to the selection networks in accordance with the principles of the invention. Control networks 78 and 80 of respective banks 10 and 12 respectively include flip flops E101 to E106 and E201 to E206. As will be explained in further detail subsequently, in bank 10 for example, flip flops E101 and E102 form a mod-four memory phase counter, flip flop E103 forms a read-write control flip flop, flip flop E104 indicates that the memory cycle presently in process is an input-output cycle, flip flop E105 indicates that the memory cycle presently in process is the result of an arithmetic request and flip flop E106 serves to gate the output signals from the data register 22 to the *I/O* data bus 43.

Data selection networks 82 and 84 of respective banks 10 and 12 include gating arrangements which determine, receive and transmit that information that is directly associated with the corresponding memory bank. Each data selection network "ands" each bit of the corresponding data register with selected signals from the flip flops E104 and E106 of the corresponding control network. Each of the bit respective products from all banks or modules are "ored" together to pass signals to the common output lines of the bus 43. The products of E105 and the data bits are "ored" together to pass signals to the output lines of the data bus 47. The input lines of the buses 55 and 45 are controlled in a similar manner, as will be subsequently explained in further detail. Feedback networks 79 and 81 provide control signals such as EAU to the PCU sequencer 42 of the arithmetic unit to inhibit the arithmetic operation when the selected memory bank is accessed by a higher priority request or when the selected memory bank is currently in a memory cycle operation. The data registers 22 and 24 may respectively include flip flops D100 to D117 and D200 to D217 when the computer utilizes an 18 bit word, for example.

Figure 3:
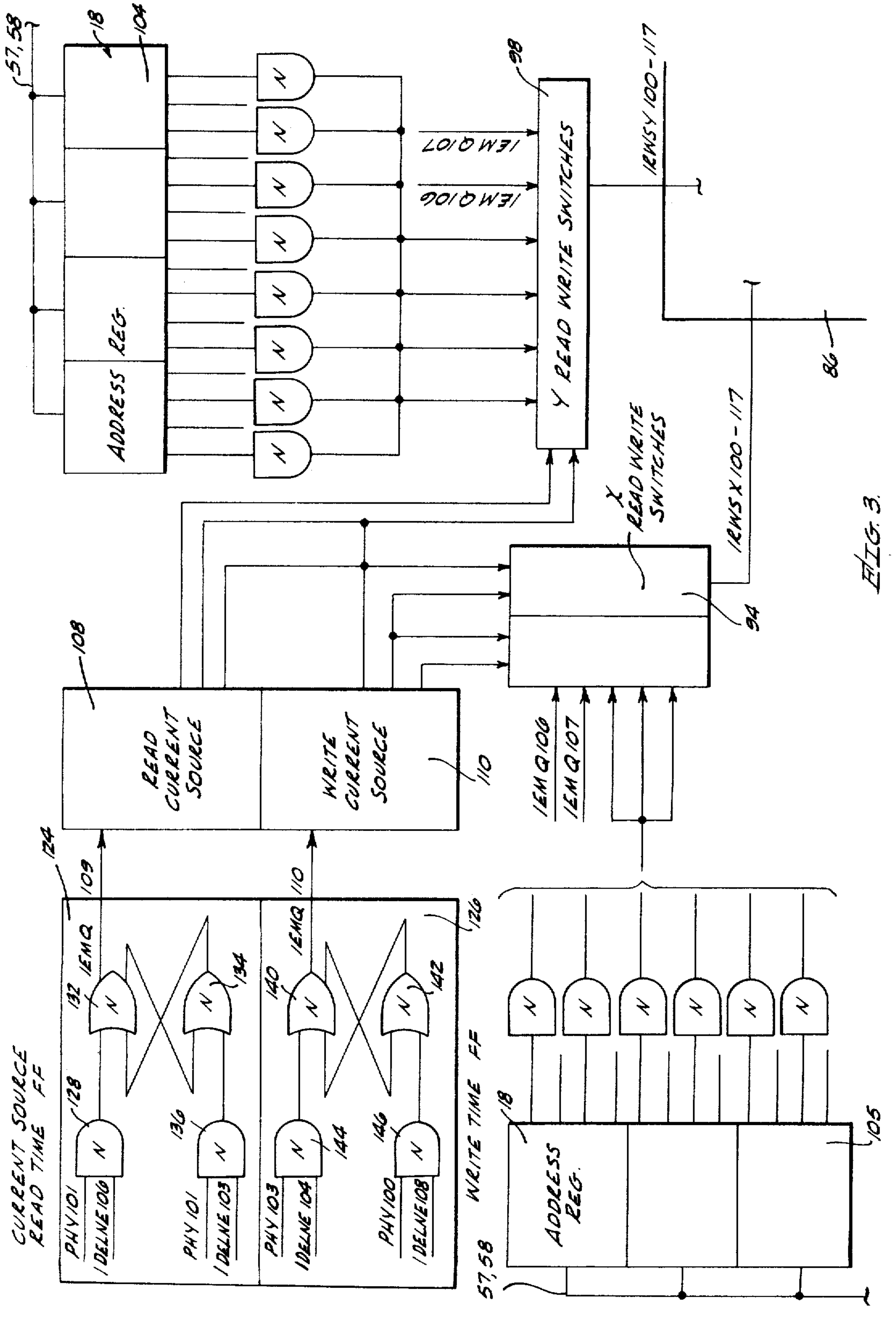
FIG. 3 is a schematic block diagram showing a first portion of one of the memory banks of FIG. 1.
Figure 4:
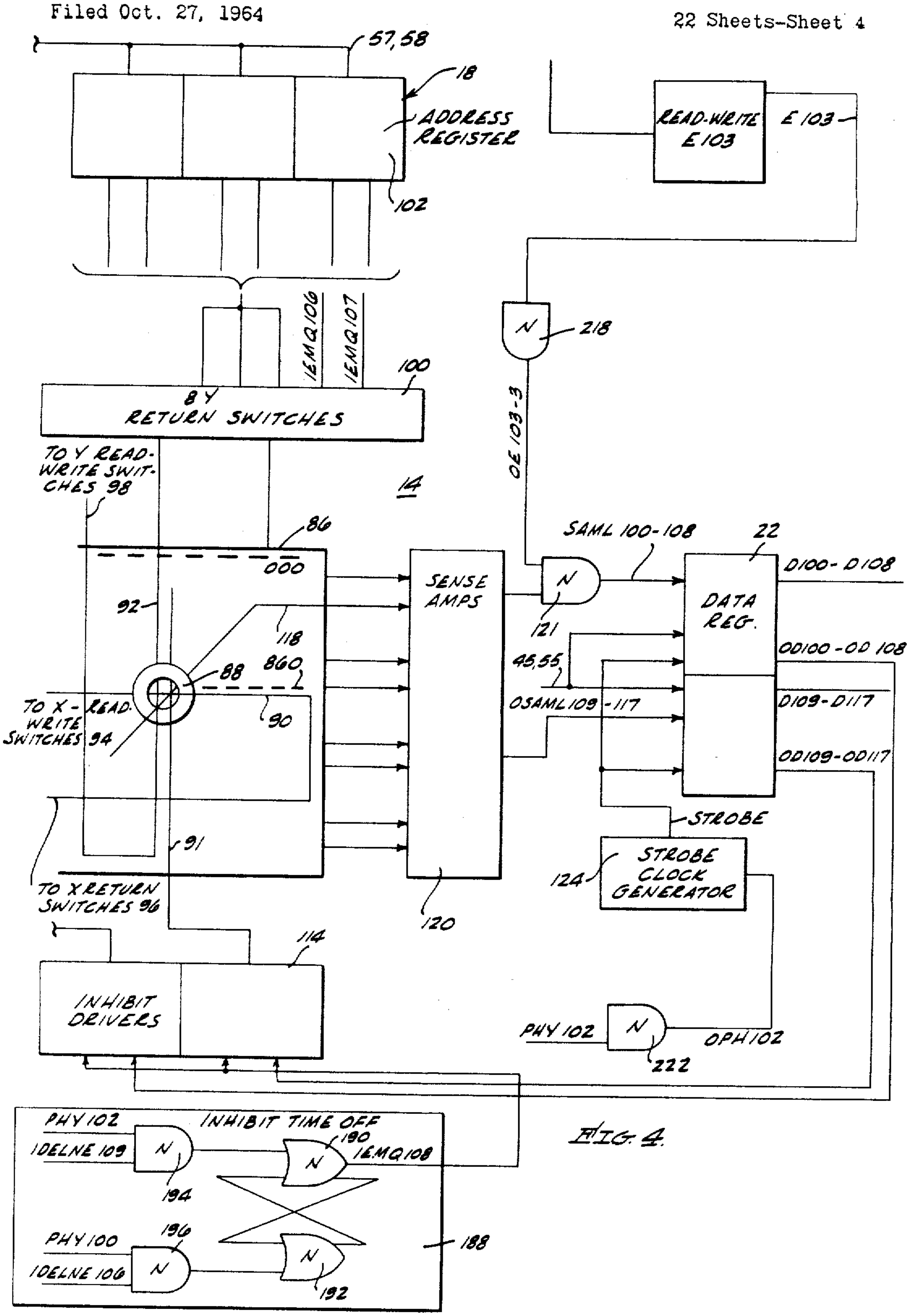
FIG. 4 is a schematic diagram showing a second portion of one of the memory banks of FIG. 1.
Figure 5:
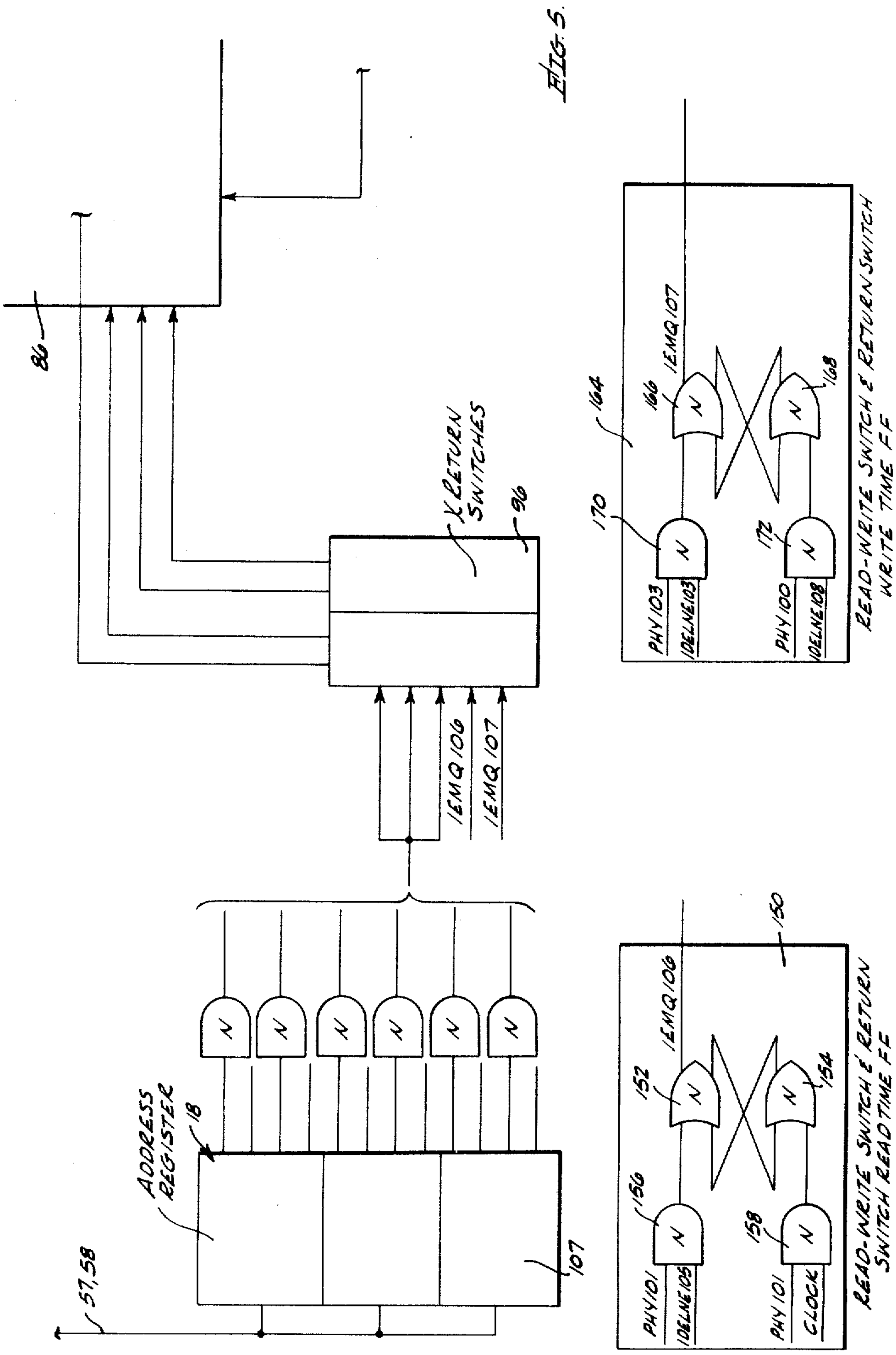
FIG. 5 is a schematic block diagram showing a third portion of one of the memory banks of FIG. 1.

Referring now to FIGS. 3, 4 and 5 which shows the memory array unit 14 of the bank 10, as well as the data register 22, address register 18 and other control elements, the arrangement thereof will be explained in further detail. It is to be understood that the memory array unit 16 and associated elements of bank 12 are also similar to that shown in FIGS. 3, 4 and 5 except that control and timing signals of bank 12 are utilized as will be explained subsequently. Included in the memory unit 14 is a storage array 86 which may include a plurality of magnetic cores such as a core 88 arranged in word positions in the X direction, for example, each having an address such as 000 and 860. Selection of a word position or cell is performed by selecting a plurality of X drive lines such as 90 and a plurality of Y drive lines such as 92. As is well known in the art, reading may be performed by changing all cores at a position of coincidence of selected X and Y drive lines to the "zero" state to sense switching of the cores and writing may be performed by switching all cores at the selected positions to the "one" state except when an inhibit pulse is present on a lead such as 91 to prevent the writing of a "one." Selection in the X direction may be performed by a plurality of X read-write switches 94 and a plurality of X return switches 96. Selection in the Y direction may be performed by a plurality of Y read-write switches 98 and a plurality of Y return switches 100. As is well known in the art, the X drive lines such as 90 are grouped to a common connection at each end so that a single line can be selected with a minimum of switching circuits. The Y drive lines are connected in groups at one end thereof in a similar manner. The address register 18 which is shown in portions 102, 104, 105 and 107 for purposes of illustration, provides address signals to the X read-write switches 94 and the X return switches 96 and provides address signals to the Y read-write switches 98 and Y return switches 100. The address is applied to the address register 18 on the plurality of leads of the buses 57 and 58 of FIG. 2.

For applying half amplitude current pulses through the X read-write switches 94 and the Y read-write switches 98, a read current source 108 and a write current source 110 are coupled thereto with appropriate leads. It is to be noted that the arrangement of FIGS. 3, 4 and 5 provide a coincident selection arrangement, as is well known in the art, but other types of selection such as a linear selection of word positions may be utilized in accordance with the principles of the invention. For inhibiting the writing of a "one," that is, to write a "zero," inhibit drivers 114 are responsive to the data register 22 to pass half amplitude inhibiting pulses through a plurality of leads such as 91. For example, one inhibit line such as 91 may couple one core of each word position, the cores being at a position of similar binary significance. Also coupled through each core is a sense lead such as 118 which applies interrogated signals to a plurality of sense amplifiers 120. Each sense lead such as 118 may couple a core of the same binary significance of each word storage position, for example. The signals applied to the sense amplifiers 120 pass through gates such as 121 and to the data register 22, being entered therein in response to strobe pulses generated by a strobe clock generator 124 and applied to the clock input terminal (FIG. 7) of the flip flops thereof.

The timing control of the memory unit 14 includes a current source read timing flip flop circuit 124 and a current source write timing flip flop circuit 126 which respectively control the read current source 108 and the write current source 110. As well known in the art, the selection at the read-write switches 94 and 98 and at the return switches 96 and 100 is performed prior to applying current pulses thereto. In a conventional manner, the current pulses passed through the X and Y drive lines in response to the read current source 108 and the write current source 110 may flow in opposite directions during reading and writing.

Figure 6:
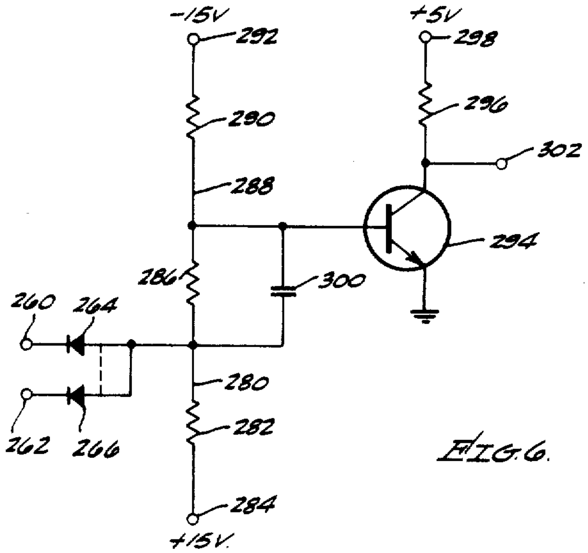
FIG. 6 is a schematic circuit diagram of a NAND (negative and) gate that may be utilized for logical gating in the system in accordance with the invention.

Before further proceeding with the explanation of the memory 14, it will be noted at this time that the system in accordance with the principles of the invention may utilize a NAND (negative and) logical arrangement. However, it is to be understood that the principles of the invention are applicable to any type of logical system such as one utilizing diode "and" gates and diode "or" gates. Also the principles of the invention are not limited to binary systems but are equally applicable to any type of digital system. A typical NAND gate that may be utilized as shown in FIG. 6 has the properties of developing a false output signal when all of the input signals are true and developing a true output signal when any of the input signals are false. Logical levels that may be utilized in the system of the invention are +5 volts for a true level and 0 volt or ground for a false level, for example. As is well known in the art, a NAND gate such as shown in FIG. 6 functions both as an "and" gate and an "or" gate as determined by the signal arrangement coupled thereto. When a coincident condition is derived therefrom in response to all input signals going true, the NAND gate functions as an "and" gate with the false output signal representing the coincident condition. When the NAND gate is utilized with the input signals normally true to provide a false output signal, and with any input signal going false providing a true output signal, the gate functions as an "or" ate. For providing an inversion of a single signal, a NAND gate may be utilized to perform an "and" function in response to a positive going input signal (the output signal is normally true and changes to a false level in response to the input signal going to a true level) and may be utilized to perform an "or" function in response to a negative going input signal (the output signal is normally false and changes to a true level in response to the input signal going to a false level). Thus, although it is to be understood that the same gating structure of FIG. 6 may be utilized for all of the illustrated gates, different symbols are utilized for a NAND gate functioning as an "or" gate and for a NAND gate functioning as an "and" gate. Thus the symbol of a gate 128 in the current source read time flip flop 124 indicates that the NAND gate functions as an "and" gate and that an output signal at a false level is provided when all of the input signals are at a true level. The symbol of a gate 132 which has a curved portion at the input terminals, represents a NAND gate functioning as an "or" gate, that is, the output signal is at a false level unless any one or all of the input signals are false to provide an output signal at the true level. It is to be also noted at this time that a flip flop of the type shown in FIG. 7 may be utilized in the system in accordance with the invention. The flip flop of FIG. 7 responds to any signal at an informational input terminal going to a false level at clock time when the signal at a control input terminal is true and the flip flop is to be set to the "one" state. The flip flop includes complementary true and false output terminals with the signal at the true output terminal of a flip flop Q designated as Q and the signal at the false output terminal designated as OQ.

The current source read time flip flop 124 includes gates 132 and 134 functioning as "or" gates and coupled with the output terminal of each connected to an input terminal of the other. The gate 128 functioning as an "and" gate responds to a signal PHY101 from the memory phase counter of the bank 10 and to a signal 1DELNE106 from the delay line 50 of FIG. 1 to apply a signal to a second input terminal of the gate 132. A gate 136 functioning as an "and" gate responds to signals PHY101 and 1DELNE103 to apply signals to a second input terminal of the gate 134. The current source write time flip flop 126 includes gates 140 and 142 functioning as "or" gates and having an output terminal of each coupled to an input terminal of the other. Gates 144 and 146 functioning as "and" gates are respectively coupled to input terminals of the gates 140 and 142 and respectively respond to signals PHY103 and 1DELNE104 and to signals PHY100 and 1DELNE108. The output terminals of the gates 132 and 140 are respectively coupled to the read current source 108 and the write current source 110 for applying signals 1EMQ109 and 1EMQ110 for providing the proper timing operation, as will be explained subsequently.

To explain operation of the toggle flip flop arrangements utilized in the system of the invention, each of the NAND gates 132 and 134 of the circuit 124 develops a false output signal only when both input signals are true so that a coincidence of true input signals at the gate 128 applies a false signal to the gate 132 which in turn applies a true signal to the input terminal of the gate 134. The signal developed by the gate 136 is true at this time so that the gate 134 is thus maintained with a false output signal. The gate 132 is maintained with a true output signal by the gate 134 when the output signal from the gate 128 goes to a true level so that a stable state is maintained until a coincidence of true signals at the gate 136 develops a false signal thereat. The gate 132 then develops a false signal to terminate the timing pulse at the output lead thereof and the gate 134 is maintained with a true output signal to provide the second stable state. The write time flip flop 126 operates in a similar manner and will not be explained in further detail.

Timing control during reading is provided for the read-write switches 94 and 98 and the return switches 96 and 100 by a timing circuit 150 which includes NAND gates 152 and 154 functioning as "or" gates of a toggle flip flop with the output terminal of each coupled to an input terminal of the other. NAND gates 156 and 158 functioning as "and" gates are coupled to input terminals of respective gates 152 and 154 and respectively respond to signals PHY101 and 1DELNE105 and to signals PHY101 and a clock signal from the clock 48 of FIG. 1. The output terminal of the gate 152 applies a timing signal 1EMQ106 to the switches 94, 98, 100 and 96. For timing control of the read-write switches 94 and 98 and the return switches 96 and 100 during writing, a write timing circuit 164 includes NAND gates 166 and 168 functioning as "or" gates and each having an output terminal coupled to an input terminal of the other and respectively responsive to NAND gates 170 and 172. The NAND gate 170 which functions as an "and" gate, responds to signals PHY103 and 1DELNE103 and the NAND gate 172 also functioning as an "and" gate responds to signals PHY100 and 1DELNE108. The output terminal of the gate 166 applies a timing signal 1EMQ107 to the switching circuits 94, 96, 98 and 100.

An inhibit timing flip flop circuit 188 includes NAND gates 190 and 192 functioning as "or" gates, each having an output terminal coupled to an input terminal of the other and respectively responsive to NAND gates 194 and 196 functioning as "and" gates. The gate 194 receives signals PHY102 and 1DELNE109 and the gate 196 receives signals PHY100 and 1DELNE106. The signal 1EMQ108 at the output terminal of the gate 190 is applied to the inhibit driver circuit 114 for controlling the proper timing thereof.

The read-write flip flop E103 has a true output terminal coupled through a NAND gate 218 functioning as an inverter to gates such as the gate 121 functioning as an "and" gate in conjunction with the interrogated signals from the sense amplifier circuit 120. When the flip flop E103 is at a "zero" state, a normal read restore cycle occurs, that is, the memory output data is transferred to the data register as signals SAML100 to SAML108 and 0SAML109 to 0SAML117. However, when the flip flop E103 is set to a "one" state, the memory output is blocked and new data from either the arithmetic unit or the input-output unit is transferred into the data register 22 on the buses 55 or 45.

The strobe clock generator 124 is controlled to provide a strobe pulse during phase two of each memory cycle. This control is provided by a NAND gate 222 responsive to a signal PHY102. The NAND gate 222 responds at phase two time of a memory read cycle to apply a signal 0PHY102 to the strobe clock generator 124.

Referring now to FIG. 6, a typical NAND gate that may be utilized in the system in accordance with the invention will be explained in further detail before proceeding with the system arrangement. A plurality of input terminals 260 and 262 are coupled through the cathode to anode paths of respective diodes 264 and 266 to a lead 280 which in turn is coupled through a resistor 282 to a +15 volt terminal 284. The lead 280 is also coupled through a resistor 286 to a lead 288 and in turn through a resistor 290 to a −15 volt terminal 292. The lead 288 is also coupled to the base of an NPN type transistor 294 having an emitter coupled to ground and a collector coupled through a resistor 296 to a +5 volt terminal 298. A capacitor 300 may be coupled between the base of the transistor 294 and the lead 280 for reducing the rise time of the transistor when being biased into conduction. An output terminal 302 of the gate is coupled to the collector of the transistor 294. In operation, a false signal of 0 volt applied to either or both of the input terminals 260 and 262 causes current to flow from the terminal 284 through the resistor 282 and through the corresponding diode or diodes so that the transistor 294 is maintained in a nonconductive state and a +5 volt or true signal is provided on the terminal 302. When both of the input signals applied to the terminals 260 and 262 are true or +5 volts, the diodes 264 and 266 are biased out of conduction and a positive voltage is maintained at the base of the transistor 294 so that the transistor is biased into conduction. In this state, approximately ground potential or a false signal level is applied to the terminal 302. As previously discussed, the NAND gate of FIG. 6 functions as an "and" gate to develop a false output signal only when all of the input signals are at true levels. When all of the input terminals are normally maintained at true levels to maintain a false signal at the output terminal 302, the gate functions as an "or" gate in response to any or all of the input signals going to a false level to develop a true output signal. When functioning as an inverter in response to a positive going input signal (that is with the output terminal normally at a true level), all unused input terminals of the gate of FIG. 6 may be coupled to a +5 voltage and the input signal going true at the single active input terminal causes the output signal to go false, which is similar to the operation of the NAND gate when performing an "and" function. When the NAND gate of FIG. 6 functions as an inverter in response to a negative going input signal (the output signal is normally false), all unused input terminals are coupled to a +5 volt level and the single active input terminal going false causes the output signal to go true which is similar to the operation of the NAND gate when functioning as an "or" gate. Thus, depending on whether the gate of FIG. 6 normally has a true output signal or a false output signal, the symbols utilized in the illustrated system are respectively that of an "and" function and of an "or" function.

Figure 7:
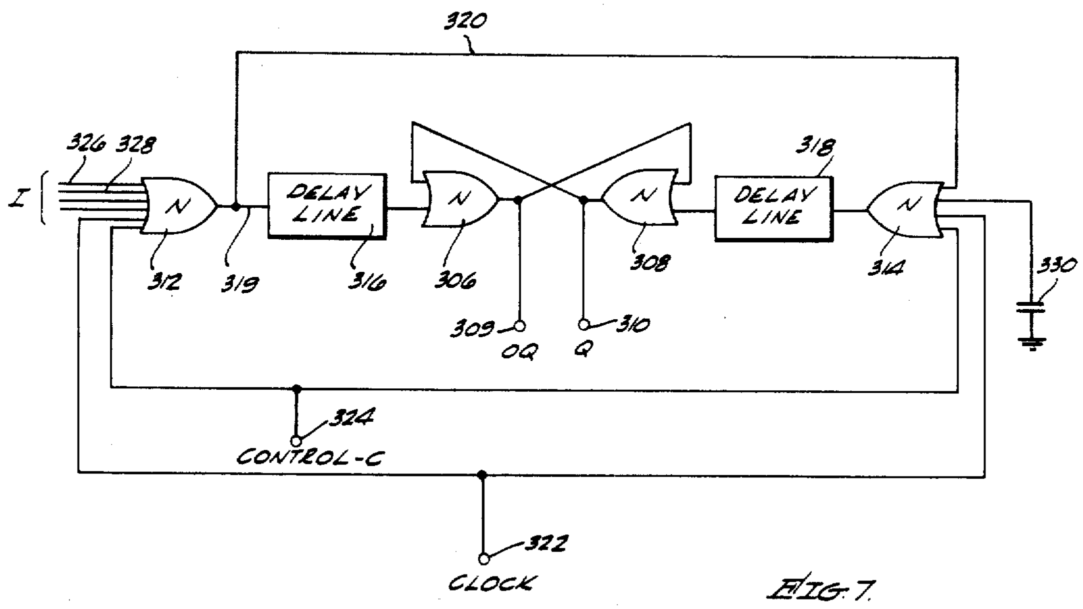
FIG. 7 is a schematic block diagram of a flip flop that may be utilized in the system of the invention.

Referring now to FIG. 7, which shows a flip flop that may be utilized in the system of the invention, NAND gates 306 and 308 are provided to function as "or" gates with the output terminal of the gate 306 coupled to the false output terminal 309 as well as to the input terminal of the gate 308 and with the output terminal of the gate 308 coupled to a true output terminal 310 as well as to an input terminal of the gate 306. The toggle operation of the gates 306 and 308 is controlled by NAND gates 312 and 314 functioning as "or" gates and respectively coupled through delay lines 316 and 318 to input terminals of respective NAND gates 306 and 308. The output terminal of the gate 312 is coupled through leads 319 and 320 to an input terminal of the gate 314. A source of clock pulses at a terminal 322 and a source of control pulses C at a terminal 324 are also applied to the gates 312 and 314 which function as "or" gates. The informational input signals I are applied through leads such as 326 and 328 to the gate 312. For accommodating delays between the informational signals applied to the lead 320 and the clock signal, a capacitor 330 is coupled between ground and one input terminal of the gate 314. Unused input terminals to the gate 312 are coupled to a true or constant +5 volt level.

In operation, the flip flop of FIG. 7 is utilized with the informational input signals I on the leads 326 and 328 being normally true so that upon occurrence of the clock and control input signals, the signal on the lead 320 is false. The information input leads such as 326 and 328 are normally true in the absence of a coincidence condition at NAND gates (not shown) coupled thereto. The signal on the lead 319 is always true except at clock time when it becomes false to set the flip flop to the false state if all of the informational input signals are true and the control input signal is true. However, if one of the informational signals is false at clock time, the signal on the lead 319 is true and the flip flop is set to the true state or remains in the true state. For example, if the flip flop is in the false state with a true or +5 volt level signal at the terminal 309, the input signals to the gate 308 are both true so that a false signal at the terminal 310 is applied to the gate 306 along with the normally true signal on the lead 319. When one of the informational input signals on the leads such as 326 and 328 is false at clock time, the signal remains true on the lead 319. As a result, a false signal is developed by the gate 314 so that the gate 308 develops a true output signal. The gate 306 thus develops a false signal which maintains the gate 308 developing a true signal. The signal on the lead 319 remains true after clock time so that a false output signal is maintained by the gate 306 and a true output signal by the gate 308 to provide a stable "one" state for the flip flop. The flip flop operates in a similar manner when previously storing a true state and the informational inputs and the control input signal are all true at clock time to change the gate 306 to a state of having a positive or true output which is the stored "zero" state. The delay lines 316 and 318 provide delays of the input signals so that information may be reliably interrogated from the terminals 309 and 310 at the beginning of a clock period and new information may be written therein during the same clock period. It is to be noted that the signal at the control input terminal 324 must be true at clock time for the flip flop to change state. If the signal at the control input terminal 324 is false at clock time, the flip flop remains in its previous state as the signal on the lead 319 remains true and the signal developed by the gate 314 remains at the true level. Also if the signal at the control input terminal 324 is maintained at a true level, the flip flop is reset to the true state at clock time to function as a delay flip flop if all of the informational input signals are true.

Figure 8:
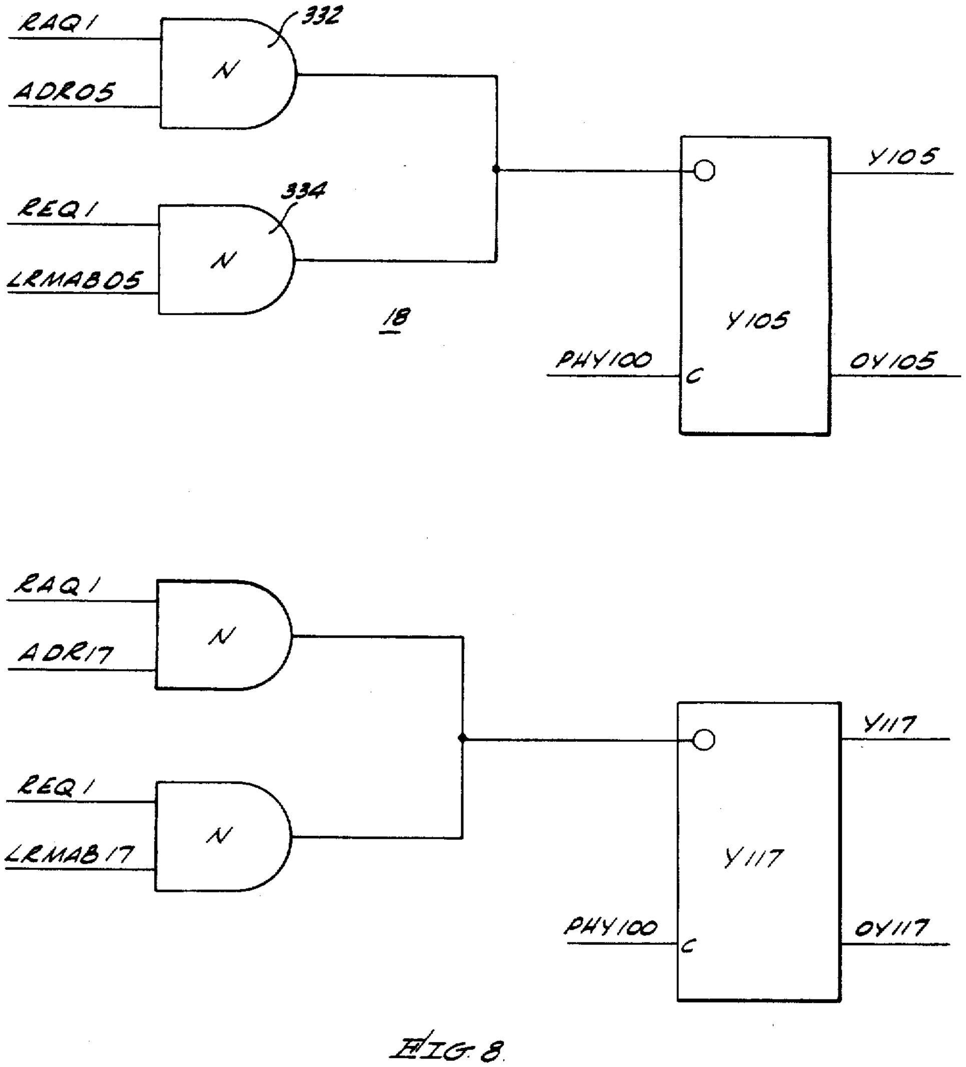
FIG. 8 is a schematic block diagram of the address register of FIG. 2 for use in one of the memory banks.

Referring now to FIG. 8, the address registers 18 and 20 of FIG. 2 each respectively include thirteen flip flops Y105 to Y117 and Y205 to Y217 which store the thirteen least significant bits of the fifteen bit memory address, for example, that may be utilized in accordance with the principles of the invention. The thirteen bit address represents a location reference for a particular word in each of the plurality of memory banks, the banks being selected by the selection networks responding to the fourteenth and fifteenth most significant bits of the address (the fourth and fifth least significant bits when related to the 18 bit computer word), for example, or to the fourteenth most significant bit (the fifth least significant bit when related to the 18 bit computer word) in the illustrated arrangement utilizing only two memory banks. Although only the address register 18 is shown in FIG. 8, it is to be understood that the address register 20 is similar except the control signals are utilized from the selection network 72 rather than from the selection network 70. NAND gates 332 and 334 functioning as "and" gates have their output terminals coupled together to provide an "or" function before passing a signal into the informational input terminal of the flip flop Y105. It is to be noted that with two of the NAND gates of FIG. 6 functioning as "and" gates to develop a false signal when the input signals are all true, a false signal provided by the conducting transistor 292 of either or both of the two gates maintains a false signal at the common output lead. Thus, two NAND gates functioning as "and" gates and connected together as shown at flip flop Y105 provide an "or" function of the two NAND gates. The gate 332 responds to an arithmetic request granted signal RAQ1 derived from the selection network 70 and to an arithmetic address signal ADR05. The gate 332 responds to an input-output request granted signal REQ1 developed by the selection network 70 to an input-output line receiver address signal LRMAB05. Each flip flop Y106 through Y117 responds to a similar gating arrangement as does flip flop Y105 receiving the common signals RAQ1 and REQ1. However, the gates at each flip flop receives different address signals such as ADR10 and LRMAB10 for flip flop Y110 and ADR17 and LRMAB17 for flip flop Y117.

In the address register 20 of the bank 12, the same addresses such as ADR05 or LRMAB05 and ADR17 or LRMAB17 are applied to flip flops Y205 and Y217 as indicated in FIG. 2. However, the control signals applied to the gates similar to gates 332 and 334 of flip flops

Y205 to Y217 are respectively an arithmetic request granted signal RAQ2 for bank 12 and an input-output request granted signal REQ2. The control signals applied to the control terminal of flip flops Y105 to Y117 and Y205 to Y217 are respectively PHY100 and PHY200 which are developed in response to the memory phase counters changing to the last phase of a memory cycle.

Figure 9:
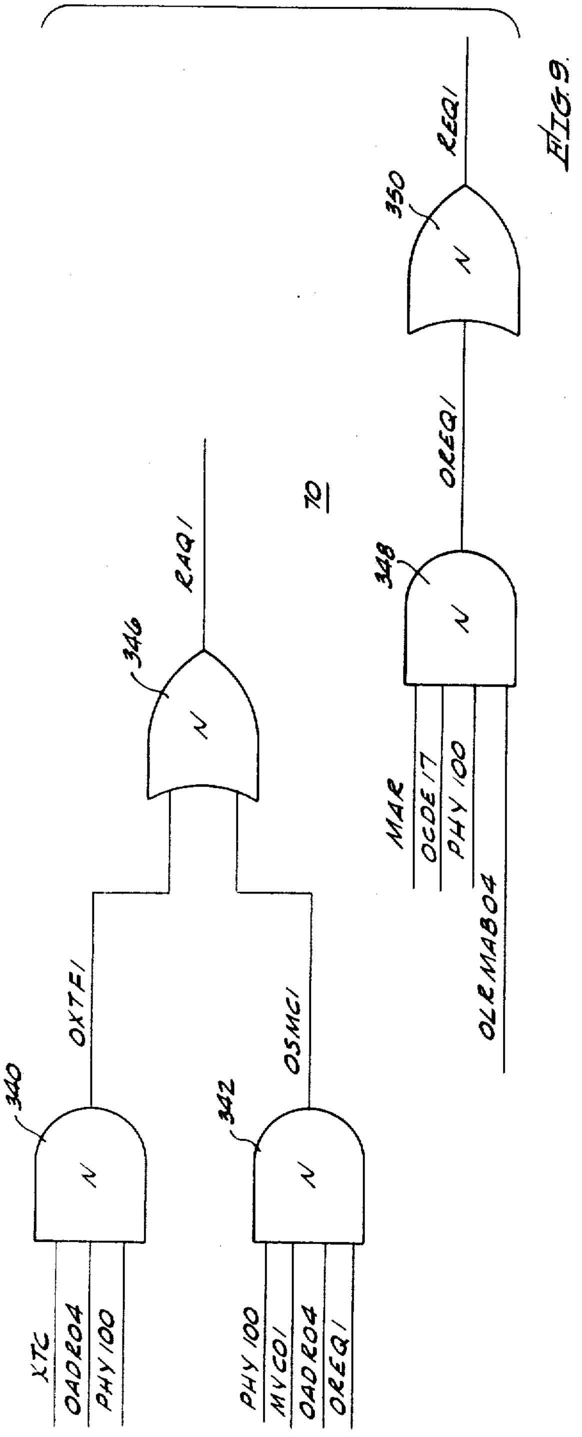
FIG. 9 is a schematic logical diagram showing the selection network of FIG. 2 for a first one of the memory banks.
Figure 10:
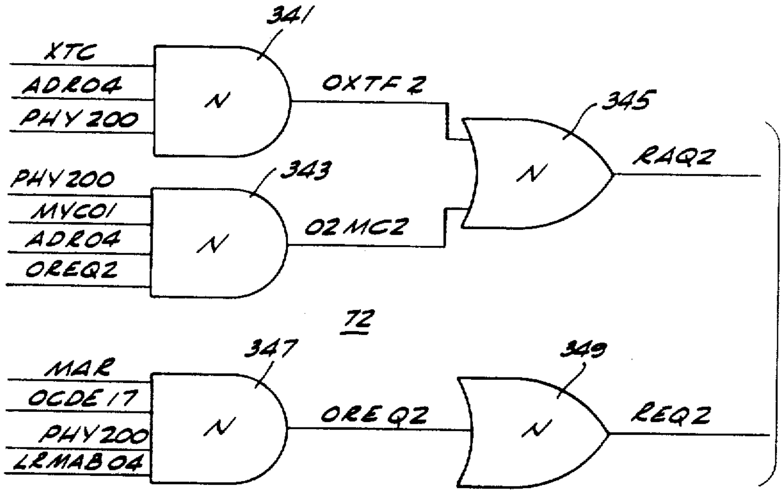
FIG. 10 is a schematic logical diagram showing the selection network of FIG. 2 for a second one of the memory banks.

Referring now to FIGS. 9 and 10, the selection network 70 includes gates 340 and 342 functioning as "and" gates with the gate 340 responding to an external function request signal XTC from the arithmetic unit (FIG. 23), a memory phase signal PHY100 which occurs at the end of a memory cycle and the gate 342 responding to the signals PHY100, an arithmetic unit memory request signal MYC01 and a signal 0REQ1 which is present when a higher priority input-output request is not granted. Also, both gates 340 and 342 respond to the most significant bit of the address being in the "zero" state, that is, the signal 0ADR04, which condition represents a request for blank 10. It is to be noted that although in the illustrated arrangement only two memory bits are shown so that only a single bit 0ADR04 is required to distinguish between the two illustrated memory banks, the principles of the invention are applicable to any number of memory banks such as four by utilizing both bits number 3 and 4 of the 18 bit word in the bank selection signals applied to the gates such as 340 and 342. A gate 346 functioning as an "or" gate receives input signals 0XTF1 from the gate 340 and signals 0SMC1 from the gate 342 to develop the arithmetic unit request granted signal RAQ1 for bank 10. The selection network 70 also includes a gate 348 functioning as an "and" gate and responsive to an input-output unit memory request signal MAR, a signal 0CDE17 which provides the condition that an external function request is not present, the signal PHY100, and the address bit from the input-output unit 0LRMAB04 to develop a signal 0REQ1. It is to be noted that when more than two memory banks are utilized, additonal address signals such as 0LRMAB03 or LRMAB03 may be applied to the gate 348. A NAND gate 350 functioning as an inverter responds to the signal 0REQ1 to develop the input-output request granted signal REQ1 for the bank 10.

The bank selection network 72 for bank 12 includes gates 341 and 343 respectively responsive to signals XTC, ADR04 and PHY200 and responsive to signals PHY200, MYC01, ADR04 and 0REQ2 to develope an arithmetic request granted signal RAQ2 for bank 12 in a NAND gate 345 functioning as an "or" gate. A gate 347 responds to a coincidence of signals MAR, 0CDE17, PHY200 and LRMAB04 to apply a signal to a NAND gate 349 and develop a signal REQ2 which represents a granted input-output request for access to bank 12. It is to be noted that the address bit 04 must be true to select memory bank 12.

Figure 11:
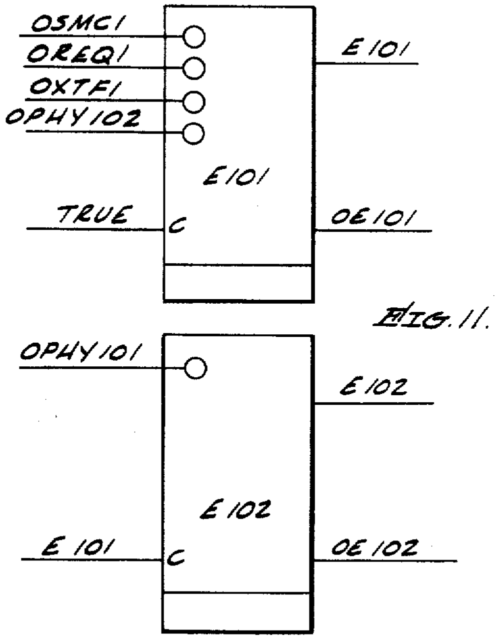
FIG. 11 is a schematic block diagram of the memory phase counter flip flops for one of the memory banks of FIG. 2.

Referring now to FIG. 11, the control circuit 78 includes memory phase counter flip flops E101 and E102 with the flip flops E101 representing the least significant bit of the mod-four phase counter. The informational input terminals of the flip flop E101 respond to signals 0SMC1, 0REQ1 and 0XTF1, one of which goes false to start a memory cycle. During counting, the informational input terminal also responds to the signal 0PHY102 going false. It is to be noted that the start memory cycle signal SMC goes true in response to a granted arithmetic unit request and the signals REQ1 and XTF go true in response to granted input-output and external function memory requests. The control input of the flip flop E101 responds to a true or constant +5 volt signal. The informational input terminals of the flip flop E102 are responsive to the signal 0PHY101. The control input of the flip flop E102 is responsive to the signal E101 derived from the true output terminal of the flip flop E101. The arrangement of the flip flops E201 and E202 of the control circuit 80 for bank 12 is similar to the circuit 78 except the informational signals 0SMC1, 0REQ1, 0XTF1 and 0PHY102 into the flip flop E101 are respectively 0SMC2, 0REQ2, 0XTF2 and 0PHY202. Also, the signals PHY100 and E101 into the flip flop E202 are PHY200 and E201.

Figure 12:
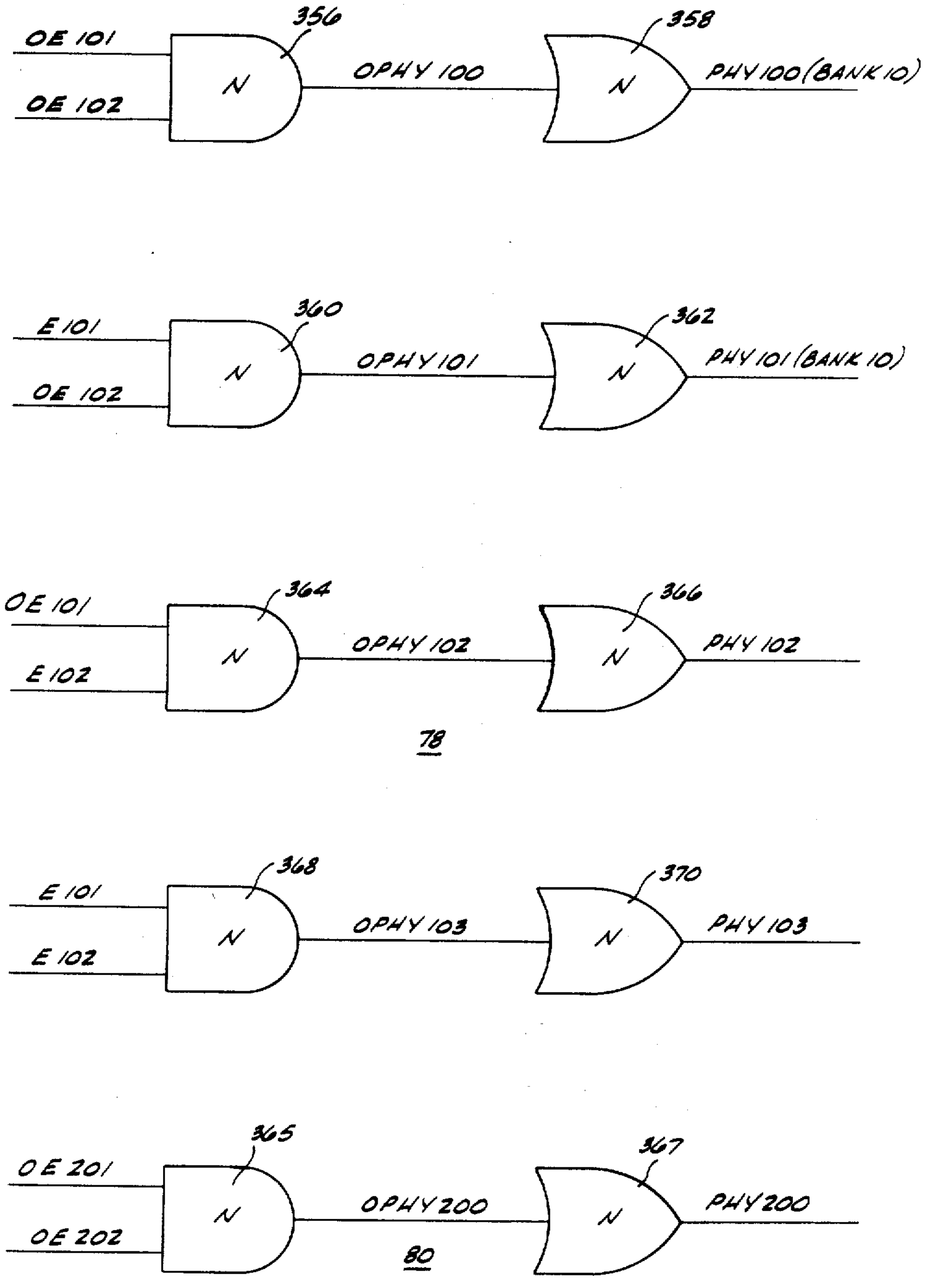
FIG. 12 is a schematic logical diagram of portions of the control circuits of FIG. 2.

Referring now to FIG. 12, the memory phase signals for the control circuit 78 of the bank 10 are developed by a gating structure including a NAND gate 356 functioning as an "and" gate and responsive to signals 0E101 and 0E102 to apply a signal 0PHY100 to a NAND gate 358 functioning as an inverter to develop a signal PHY100. A NAND gate 360 functioning as an "and" gate develops a signal 0PHY100 in response to signals E101 and 0E102 with the signal 0PHY101 being applied to a NAND gate 362 functioning as an inverter to develop a signal PHY101. A NAND gate 364 functioning as an "and" gate responds to signals 0E101 and E102 to develop a signal 0PHY102 which is applied through a NAND gate 366 functioning as an inverter to develop a signal PHY102. A NAND gate 368 functioning as an "and" gate responds to signals E101 and E102 to develop a signal 0PHY103 which is applied through a NAND gate 370 functioning as an inverter to develop a signal PHY103. The gates for developing the phase signals of the control circuit 80 is similar to that of FIG. 11 except the input signals are derived from flip flops E201 and E202 and the phase signals are designated PHY200, PHY201, PHY202 and PHY203. A NAND gate 365 is shown responding to signals 0E201 and 0E202 to apply a signal 0PHY200 to a NAND gate 367 functioning as an inverter to develop a signal PHY200. The gates for developing signals PHY201, PHY202 and PHY203 follow a pattern similar to that shown for the control unit 78.

Figure 13:
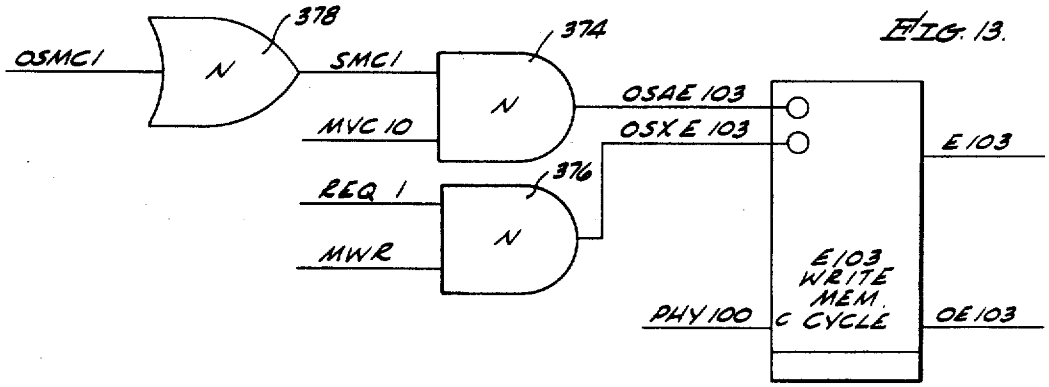
FIG. 13 is a schematic logical block diagram showing the write memory cycle flip flop utilized in the control network of a first one of the memory banks of FIG. 2.
Figure 14:
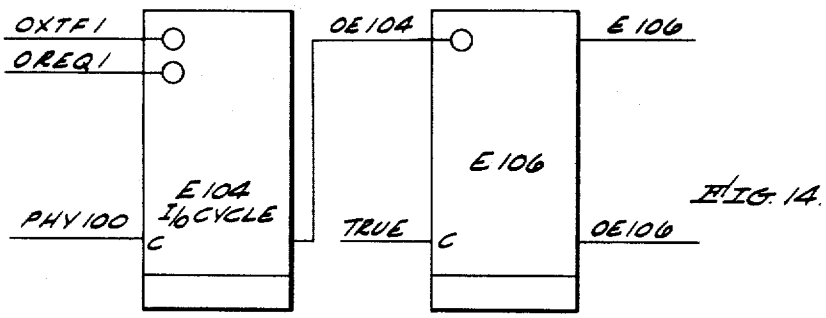
FIG. 14 is a schematic logical block diagram of the input-output cycle flip flops utilized in the control network of a first one of the memory banks of FIG. 2.
Figure 15:
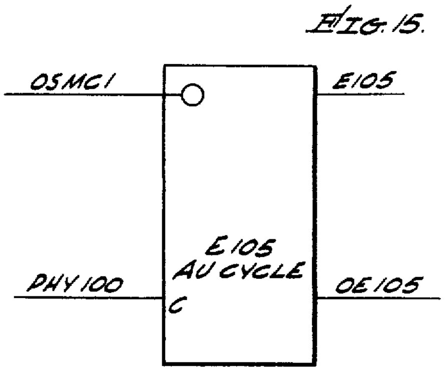
FIG. 15 is a schematic logical block diagram of the arithmetic unit cycle flip flop utilized in the control network of a first memory bank of FIG. 2.

Also included in the control circuit 78 as shown in FIGS. 13, 14 and 15 are write memory cycle flip flop E103, input-output cycle flip flop E104, AU cycle flip flop E105 and input-output data switch flip flop E106. The flip flop E103 responds at its informational input to signals 0SAE103 and 0SXE103 developed by respective NAND gates 374 and 376 functioning as "and" gates. The gate 374 receives input signals MYC10 indicating a store condition request by the arithmetic unit and to a signal SMC1 developed by a NAND gate 378 functioning as an inverter and responding to a signal 0SMC1. The gate 376 responds to an input-output request granted signal REQ1 and an input-output write request signal MWR. The signal PHY100 is applied to the control input of the flip flop E103. The flip flop E103 is set to the "one" state to inhibit the signal in the sense amplifiers from passing to the data register when it is desired to write new information from the data register into the memory. The informational input terminal of the flip flop E104 responds to signals 0XTF1 representing an external function request and 0REQ1 representing an input-output granted request. The control input of the input-output cycle flip flop E104 is responsive to the signal PHY100. In order that data is not gated to the input-output unit one clock time after the flip flop E104 is set, the input-output data switch flip flop E106 has its informational input terminal responsive to the signal 0E104 and its control input terminal maintained at a true or +5 volt level. The AU cycle flip flop E105 responds to its informational input terminals to an arithmetic unit request granted signal 0SMC1 and responds at its control input terminal to the signal PHY100. In the control circuit 80, the signals and associated gates of flip flops E203, E204, E205, and E206 are similar to E103, E104, E105 and E106 except with designations E203, E204, E205 and E206 and being responsive to the control signals in bank 12 such as REQ2, 0REQ2, 0SMC2 and PHY200.

Figure 16:
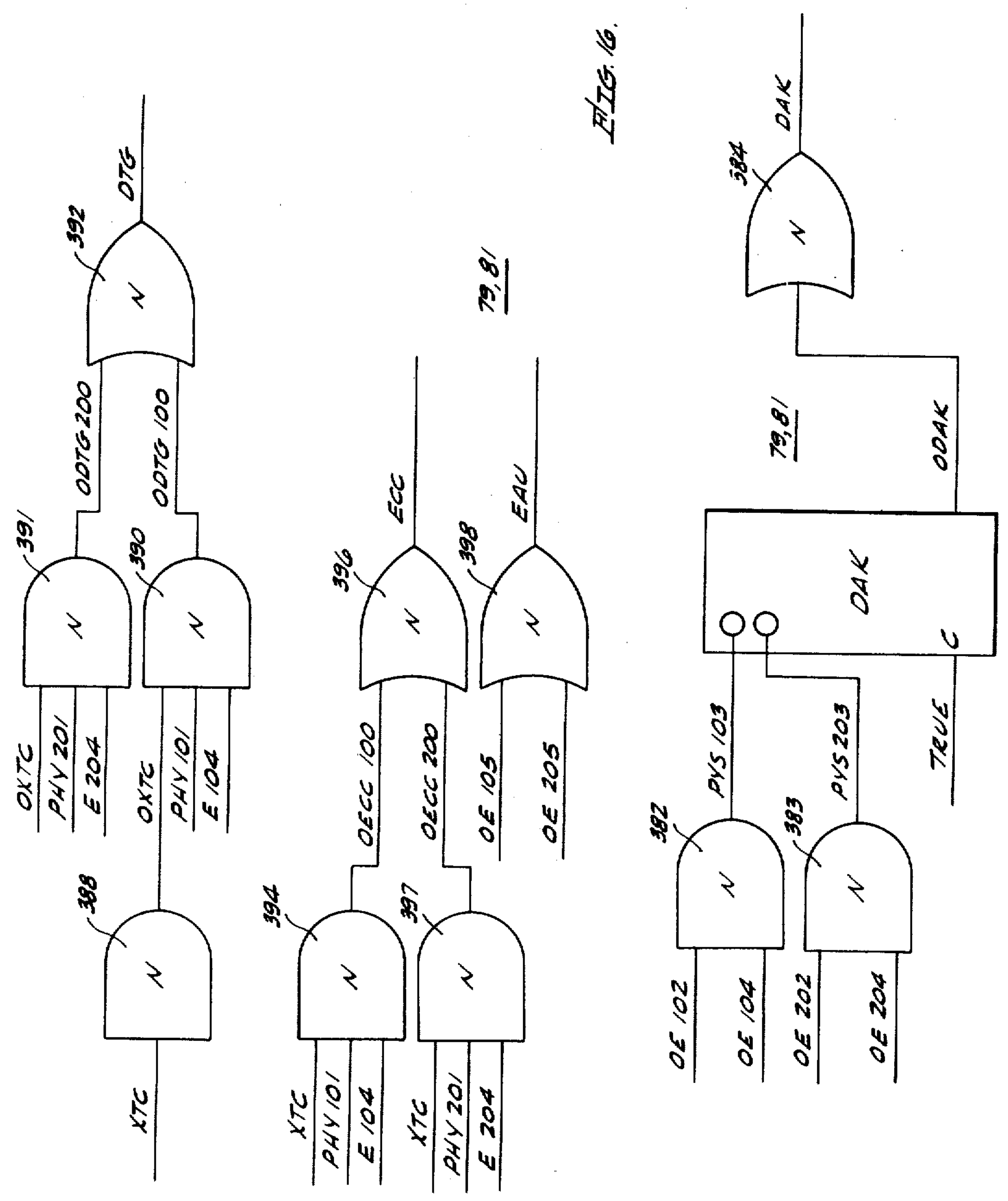
FIG. 16 is a logical block diagram showing the feedback units of FIG. 2.

Referring now to FIG. 16, the feedback networks 79 and 81 includes data acknowledge flip flop DAK for acknowledging reception of data from the input-output unit by sending a signal DAK thereto and responsive at its informational input terminals to signals PYS203 and PYS103 with the signal PYS103 being developed by a NAND gate 382 functioning as an "and" gate and receiving signals 0E102 and 0E104 from bank 10. The signal PYS203 is developed by a NAND gate 383 which responds to signals 0E202 and 0E204 in the bank 12. The control input terminal of the flip flop DAK is coupled to a true signal level of +5 volts. The false output terminal of the flip flop DAK applies the signal 0DAK through a NAND gate 384 functioning as an inverter to develop a signal DAK which is the data acknowledge signal developed by the feedback circuits 79 or 81.

To develop a data transfer granted signal DTG, a NAND gate 388 functioning as an inverter gate and responsive to the signal XTC applies the signal 0XTC to a NAND gate 390 functioning as an "and" gate. Signals PHY101 and E104, indicating that an input-output operation has been granted are also applied to the gate 390 which in turn applies a signal 0DTG100 to a gate 392 which develops the signal DTG. A signal 0DTG200 for bank 12 is also applied to the gate 392 for developing the data transfer granted signal DTG indicating that data transfer is granted to the input-output unit from the bank 12. A NAND gate 391 of the feedback circuit 81 responds to signals 0XTC, PHY201 and E204 to develop the signal 0DTG200. A NAND gate 394 of the feedback circuit 79 functioning as an "and" gate responds to signals XTC, PHY101 and E104 of bank 10 to apply a signal 0ECC100 to a NAND gate 396 functioning as an "or" gate. A similar signal from the feedback circuit 81 0ECC200 is applied to the gate 396 which develops a signal ECC indicating that an external command is coming to the input-output unit. A NAND gate 397 of the feedback network 81 responds to signals XTC, PHY201 and E204 to develop the signal 0ECC200. A NAND gate 398 functioning as an "or" gate responds to signals 0E105 and 0E205 from respective banks 10 and 12 to develop a feedback signal EAU indicating to the arithmetic unit phase counter that an arithmetic cycle request has been granted.

Figures 17, 26:
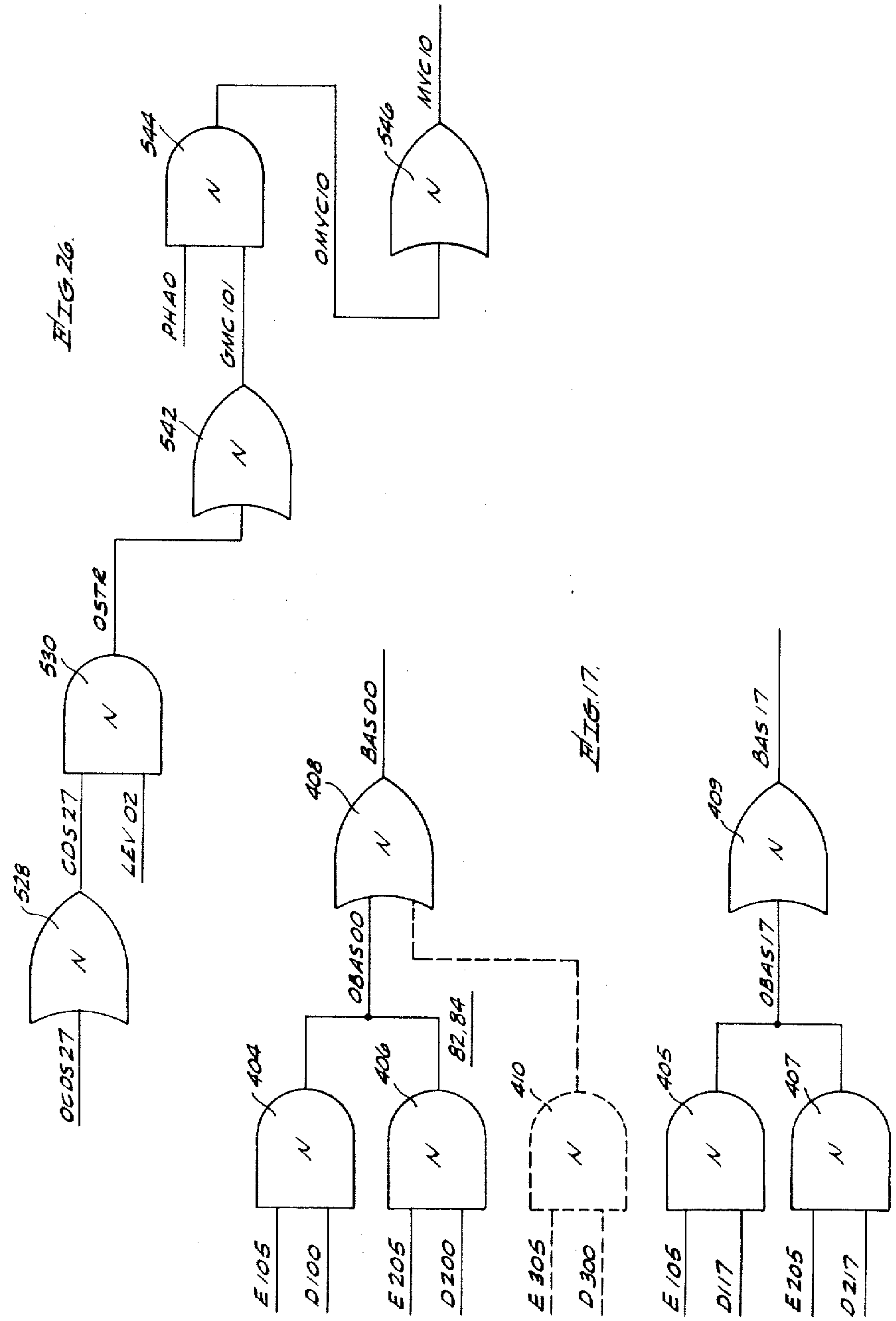
FIG. 17 is a logical block diagram showing a portion of the data selection networks of FIG. 2 for gating data to the arithmetic unit bus.
FIG. 26 is a schematic logical diagram of gates for developing control signals to request a memory write signal by the arithmetic unit of FIG. 1.

Referring now to FIG. 17, the data selection networks 82 and 84 for applying data to the arithmetic unit buses include NAND gates 404 and 406 of respective networks 82 and 84 functioning as "and" gates and respectively responsive to signals E105 and D100 and to signals E205 and D200 to apply a signal 0BAS00 to a NAND gate 408 functioning as an "or" gate which develops the signal BAS00. The signals D100 and D200 are provided by the flip flops at the least significant bit positions of the respective data registers 22 and 24 and the signal BAS00 represents the data signal applied to one of the leads of the arithmetic unit data bus 47 (FIG. 2). Similar gating arrangements of the other 17 bits of the 18 bit computer word develop signals BAS01 to BAS17. NAND gates 405 and 407 respectively responsive to signals E104 and D117 and signals E204 and D217 develop the signal BAS17 at the output terminal of a gate 409. As indicated by a dotted NAND gate 410, additional memory banks may be controlled in a similar manner at each bit level.

Figure 18:
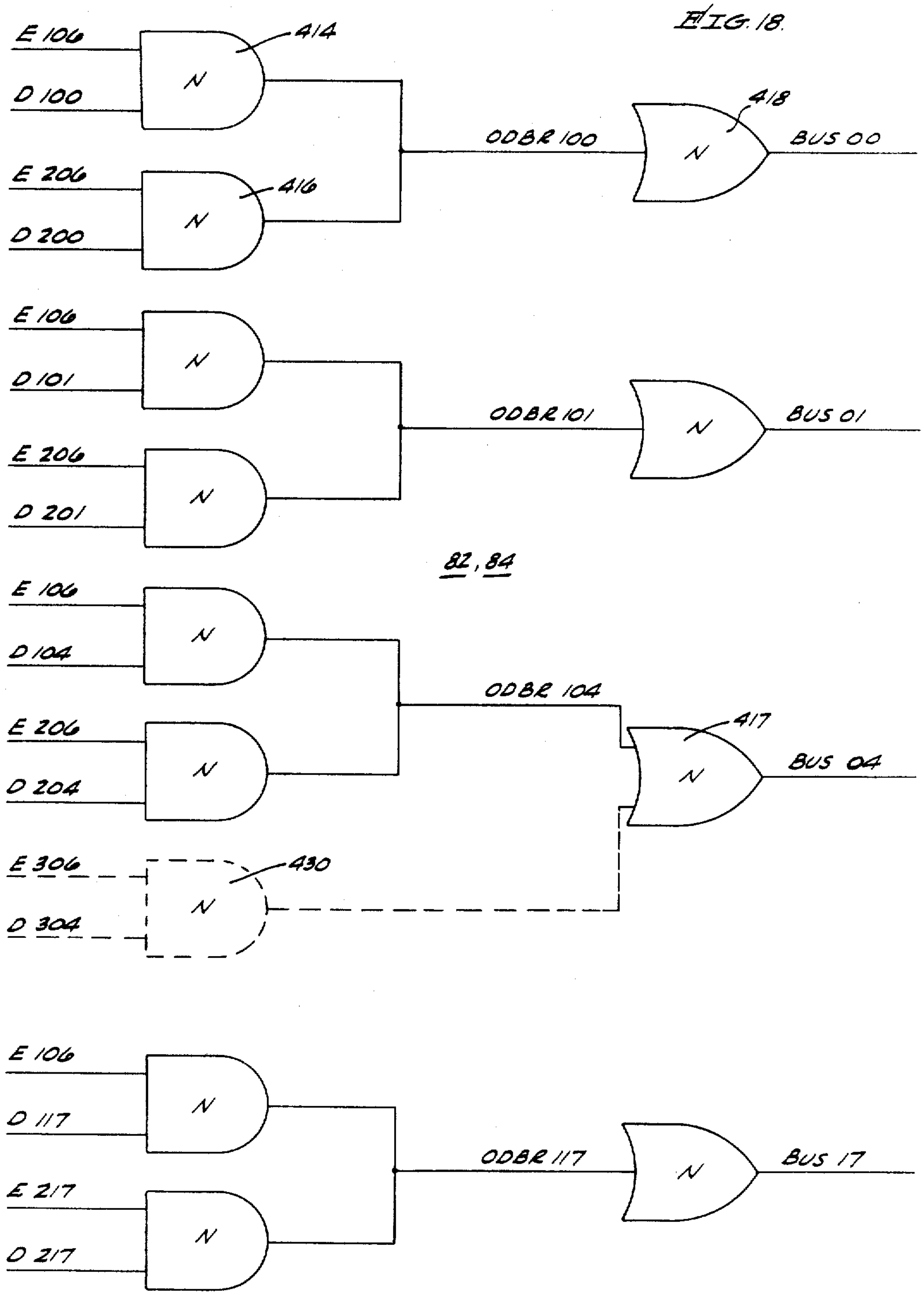
FIG. 18 is a logical block diagram showing a portion of the data selection networks of FIG. 2 for gating data to the input-output unit.

As shown in FIG. 18, the portions of the data selection networks 82 and 84 for applying data to the leads of the input-output unit buses includes NAND gates 414 and 416 functioning as "and" gates and respectively responsive to signals E106 and D100 from the bank 10 and to signals E206 and D200 from the bank 12. The gates 414 and 416 apply a signal 0DBR100 to a NAND gate 418 functioning as an "or" gate to develop a signal BUS00 which is the data signal that is gated to one of the leads of the input-output bus 43 (FIG. 2). Similarly, data representing each bit position of the 18 bit computer word is gated to the input-output unit as signals BUS01 to BUS17. As indicated at the NAND gate 417 to develop the BUS04 signal, an additional gate such as 430 may be provided at each bit level when more than two memory banks are utilized in accordance with the principles of the invention.

Figure 19:
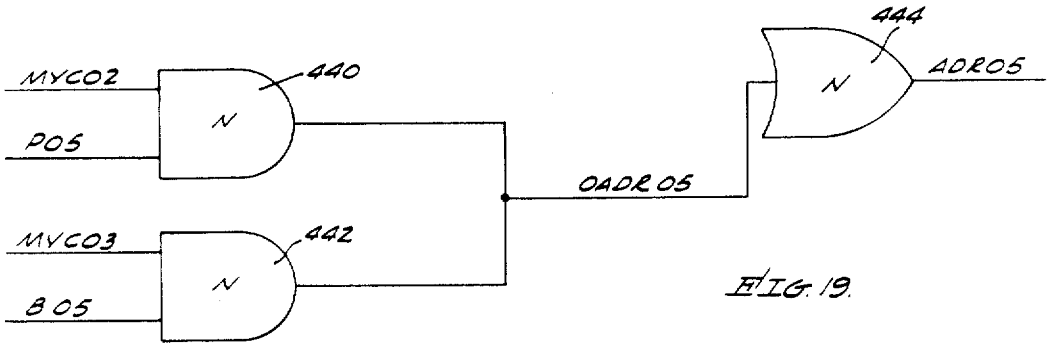
FIG. 19 is a logical block diagram of a portion of the address register of a first memory bank of FIG. 2 for gating the address from the arithmetic unit and input-output unit sources.

Referring now to FIG. 19, the address provided to the memory banks 10 and 12 by the arithmetic unit and which has a bit position such as 05, is developed or may be developed from either the program counter 38 (FIG. 1) or the B register 28 of FIG. 1. NAND gates 440 and 442 functioning as "and" gates respectively respond to signals MYC02 and P05 from the program counter and to signals MYC03 and B05 from the B register to apply a signal 0ADR05 to a NAND gate 444 functioning as an inverter gate to develop a signal ADR05. One lead of the AU address bus 57 (FIG. 2) receives the least significant bit of the address or the signal ADR05 of the 13 bit address, that may be applied to the address registers. A gating structure similar to that of FIG. 17 is provided for each of the other bit positions 6 through 17 of the total 13 bit memory address. The bank selection portion of the address such as ADR04 is also developed by a similar gating structure. It is to be again noted that in the illustrated arrangement only 14 bits are utilized for addressing the memory because only 2 banks are controlled, but that 15 bits or more may be utilized in accordance with the principles of the invention. The address from the input-output unit is applied from external devices, for example, to 14 leads of the *I/O* address bus 58 of FIG. 1, with thirteen bits being applied to the gates at the address registers (FIG. 8) as signals such as LRMAB05 and with one bit being applied to the selection networks 70 and 72 (FIGS. 9 and 10).

Figure 20:
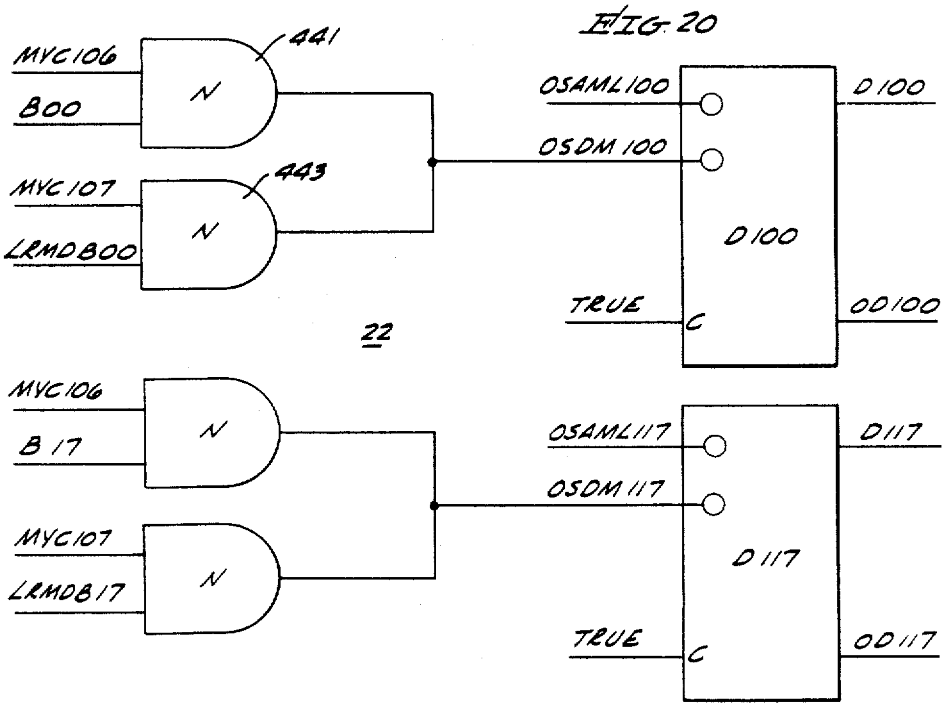
FIG. 20 is a schematic logical block diagram of the data register in a first one of the memory banks of FIG. 2.
Figure 28:
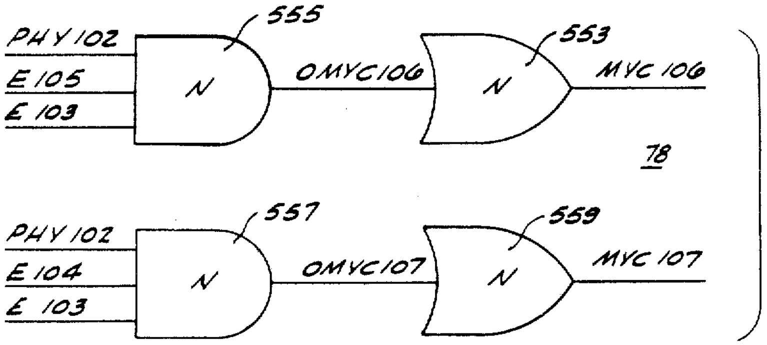
FIG. 28 is a logical diagram showing gates for developing control signals to be utilized in the data register of a first memory bank of FIG. 2.

Referring now to FIG. 20, the data register 22 of the memory bank 10 includes flip-flops D100 to D117. The flip-flop D100 responds at its informational input terminals to a signal 0SAML100 developed by the sense amplifiers 120 (FIG. 4) when information is being read from the memory and responds to a signal 0SDM100 when new data is being applied to the data register from either the arithmetic unit or the input-output unit. A NAND gate 441 functioning as an "and" gate responds to a signal B00 from the B register and a signal MYC106 indicating a request for an arithmetic unit write cycle (FIG. 28). A NAND gate 443 functioning as an "and" gate responds to an input-output unit data signal LRMDB00 and to a signal MYC107 representing a request for an input-output unit write cycle (FIG. 28). The control terminal of the flip-flops D100 to D117 are coupled to a true or +5 volt signal. A similar gating structure is provided at each flip-flop D101 to D117 except the arithmetic unit and input-output unit data signals are of the corresponding bit levels. The flip-flops D200 to D217 of the data register 24 of the bank 12 are similar to those shown in FIG. 12 except signals MYC206 and MYC207 (not shown) are applied thereto instead of signals MYC106 and MYC107.

Figures 21, 31:
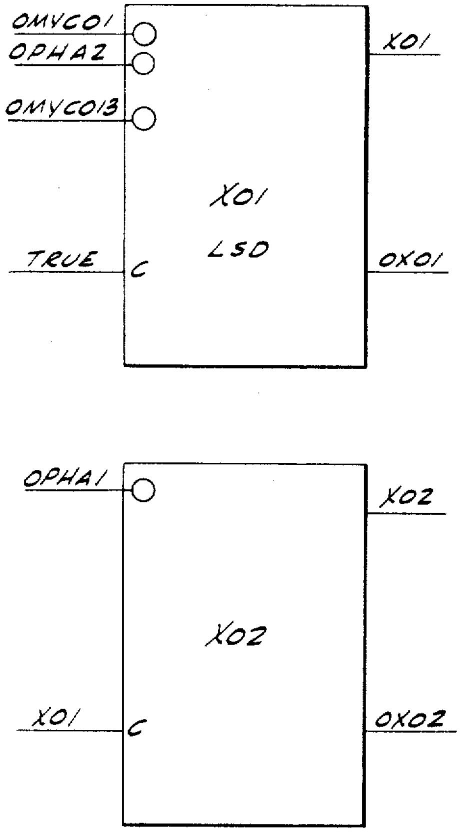
FIG. 21 is a schematic logical block diagram of the arithmetic unit phase counter utilized in the system of FIG. 1.
FIG. 31 is a schematic diagram of a table showing the phase relation of the memory phase counter and the arithmetic unit phase counter in response to selection of a common bank by both the arithmetic unit and the input-output unit.

As shown in FIG. 21, the program control unit phase counter of the PCU sequencer 42 (FIG. 1) includes flip-flops X01 and X02 with the flip-flop X01 representing the least significant bit position of the four phase counting cycle. The flip-flop X01 is responsive at its informational input terminal to signals 0MYC011, 0PHA2 and 0MYC013 and at its control input terminal to a true signal. The flip-flop X02 is responsive at its informational input terminal to a signal 0PHA1 and at its control input terminal to a signal X01.

Figure 22:
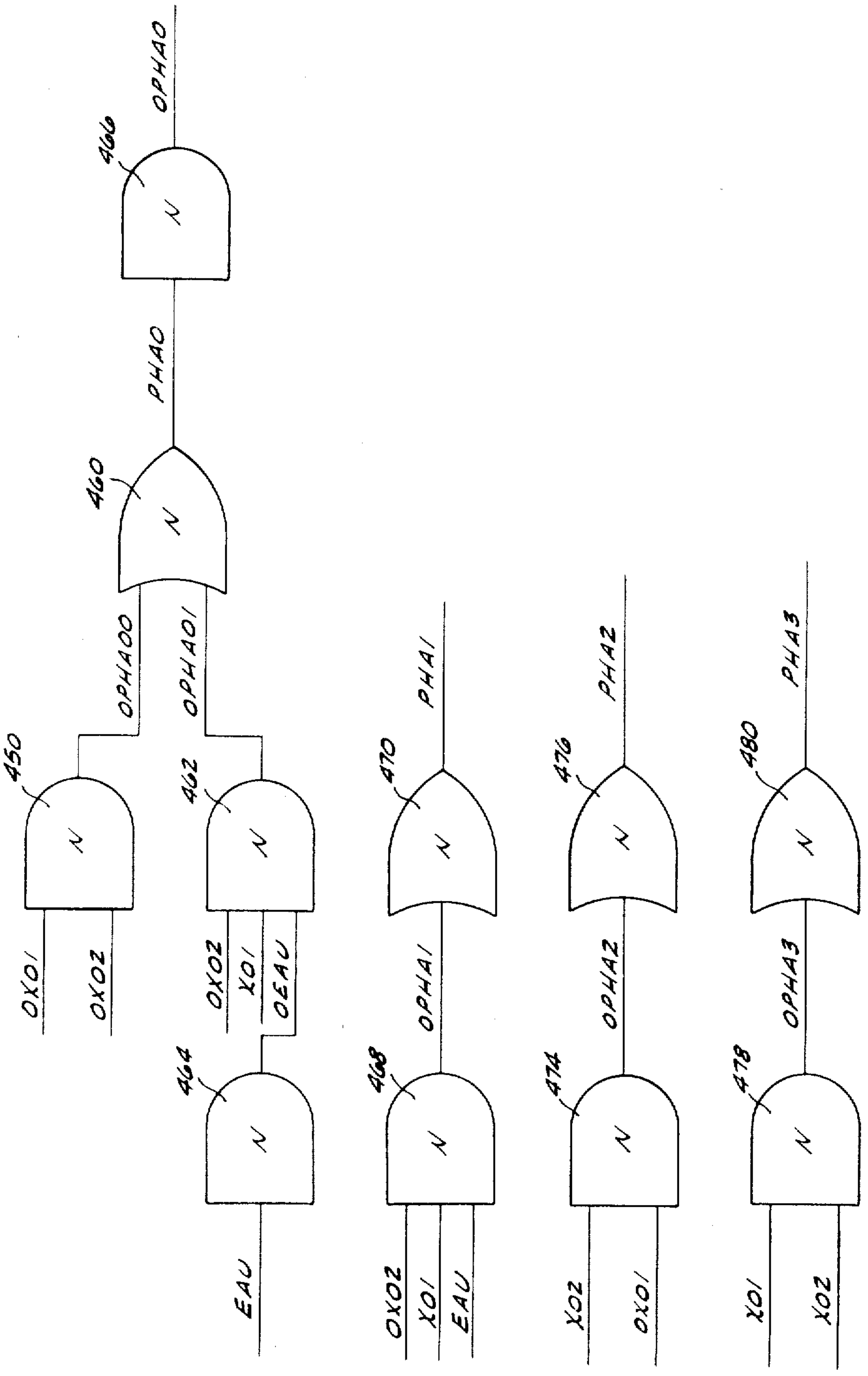
FIG. 22 is a schematic logical block diagram of gates for developing arithmetic unit control signals.

The decoding of the phase control signals of the flip-flops X01 and X02 by the arrangement of FIG. 22 includes a NAND gate 450 functioning as an "and" gate and responsive to signals 0X01 and 0X02 to develop a signal 0PHA00 which is applied to a NAND gate 460 functioning as an "or" gate. A NAND gate 462 functioning as an "and" gate responds to signals 0X02, X01, and 0EAU to apply a signal 0PHA01 to the gate 460. The gate 462 maintains the signal PHA0 at the true level when the phase counter is in state 01 and the signal EAU is false because an arithmetic unit memory request has not been granted. The signal PHA0 is maintained to prevent the computer from proceeding until the memory request is granted. The signal EAU is inverted in a NAND gate 464 to develop the signal 0EAU. The gate 460 applies the signal PHA0 through a NAND gate 466 functioning as an inverter to develop the signal 0PHA0. A signal 0PHA1 is developed by a NAND gate 468 functioning as an "and" gate and responding to signals 0X02, X01 and EAU with the signal 0PHA1 being applied through a NAND gate 470 functioning as an inverter to develop the signal PHA1. Thus, the signal PHA1 does not go to a true level until the memory feedback signal EAU goes true. A NAND gate 474 functioning as an "and" gate responds to signals X02 and 0X01 to develop a signal 0PHA2 which is applied to a NAND gate 476 functioning as an inverter to develop a signal PHA2. A NAND gate 478 functioning as an "and" gate responds to signals X01 and X02 to apply a signal 0PHA3 through a NAND gate 480 functioning as an inverter to develop a signal PHA3.

Figure 23:
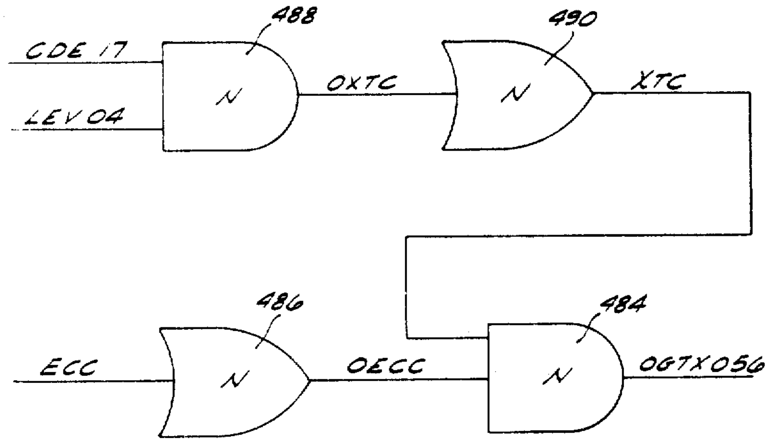
FIG. 23 is a schematic logical block diagram of gates for providing a control signal to develop and to inhibit the operation of the system of FIG. 1 during the external function command.

Referring now to FIG. 23, a signal 0GTX056 is developed by a NAND gate 484 functioning as an "and" gate and responsive to signals 0ECC and XTC. A NAND gate 486 functioning as an inverter gate responds to the feedback signal ECC to develop the signal 0ECC. A NAND gate 488 functioning as an "and" gate responds to an external function code signal CDE17 and a computer level control signal LEV04 to apply a signal 0XTC to a NAND gate 490 functioning as an inverter to develop the signal XTC. The signal 0GTX056 is a computer control signal that is applied to the flip flops such as X03 to X06 of the PCU sequencer 42 (FIG. 1) to allow the computer to proceed in a normal manner when that signal is true. When the signal ECC is false, the arithmetic unit has not been granted access to the memory for an external function request so the computer operation is halted until the signal ECC goes true. The signal ECC goes true when the external function request is granted and the computer may proceed to the next step of its operation such as requesting an arithmetic unit memory cycle. The signal XTC which also must be true for the signal 0GTX056 to be false, responds to the CDE17 signal which is derived from the external function operation code and to the LEV04 signal which represents a waiting state of the computer when applying an external function memory request to the memory system.

Figure 24:
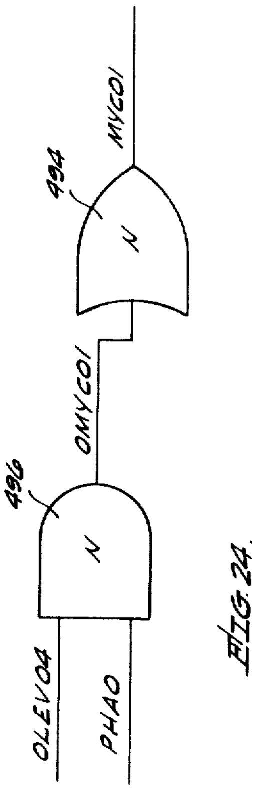
FIG. 24 is a schematic logical diagram of gates for developing the arithmetic unit memory request signal in the system of FIG. 1.

Referring now to FIG. 24, a control signal MYC01 which is a memory request signal provided by the arithmetic unit is developed by a NAND gate 494 functioning as an inverter and responsive to a signal 0MYC01. A NAND gate 496 functioning as an "and" gate develops the signal 0MYC01 in response to signals 0LEV04 and PHA0 when the computer is in the proper level or state to perform a memory request.

Figure 25:
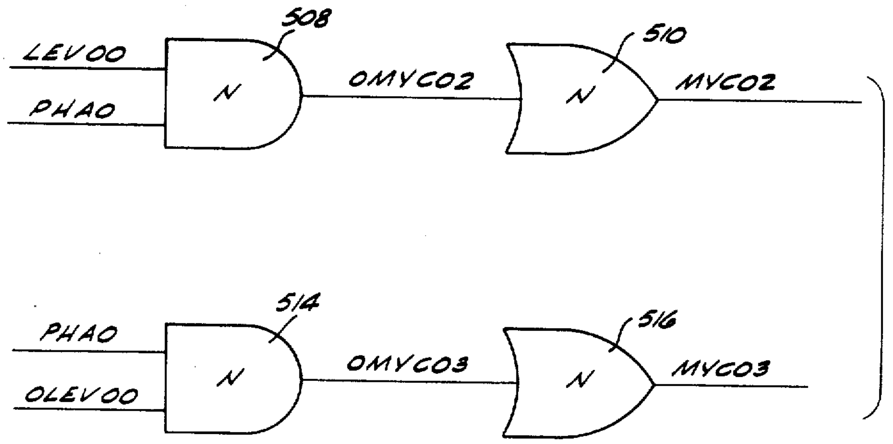
FIG. 25 is a schematic logical diagram of gates for developing control signals for transferring the arithmetic address to memory address registers in the system of FIG. 1.

Referring now to FIG. 25, a NAND gate 508 functioning as an "and" gate responds to a signal LEV00 and to the signal PHA0 to apply a signal 0MYC02 to a NAND gate 510 functioning as an inverter to develop a signal MYC02, which is an arithmetic unit request to transfer the contents of the program counter into an address register. The signal LEV00 is a computer control signal indicating the proper level or condition to transfer the contents of the program counter into the address register. A NAND gate 514 functioning as an "and" gate responds to signals PHA0 and 0LEV00 to develop a signal 0MYC03. A NAND gate 516 functioning as an inverter responds to the signal 0MYC03 to develop a signal MYC03 which provides the control for transferring the contents of the B register into the memory address register. The level signals and the code signals are provided by the PCU sequencer 42 and the command register 40 of FIG. 1 and are the type of computer control or timing signals well known in the art to form sequential computer operations.

A gating structure as shown in FIG. 26 for developing a signal MYC10 representative of an AU memory write request includes a gate 528 functioning as an inverter and responsive to a signal 0CDS27 to develop a signal CDS27 which with the computer timing signal LEV02 is applied to a NAND gate 530 functioning as an "and" gate to develop a signal 0STR. A NAND gate 542 functioning as an inverter responds to the signals 0STR to develop a signal GMC101 which with the signal PHA0 is applied to a NAND gate 544 functioning as an "and" gate to develop a signal 0MYC10. A NAND gate 546 functioning as an inverter responds to the signal 0MYC10 to develop the signal MYC10 for controlling an arithmetic unit write request.

Figure 27:
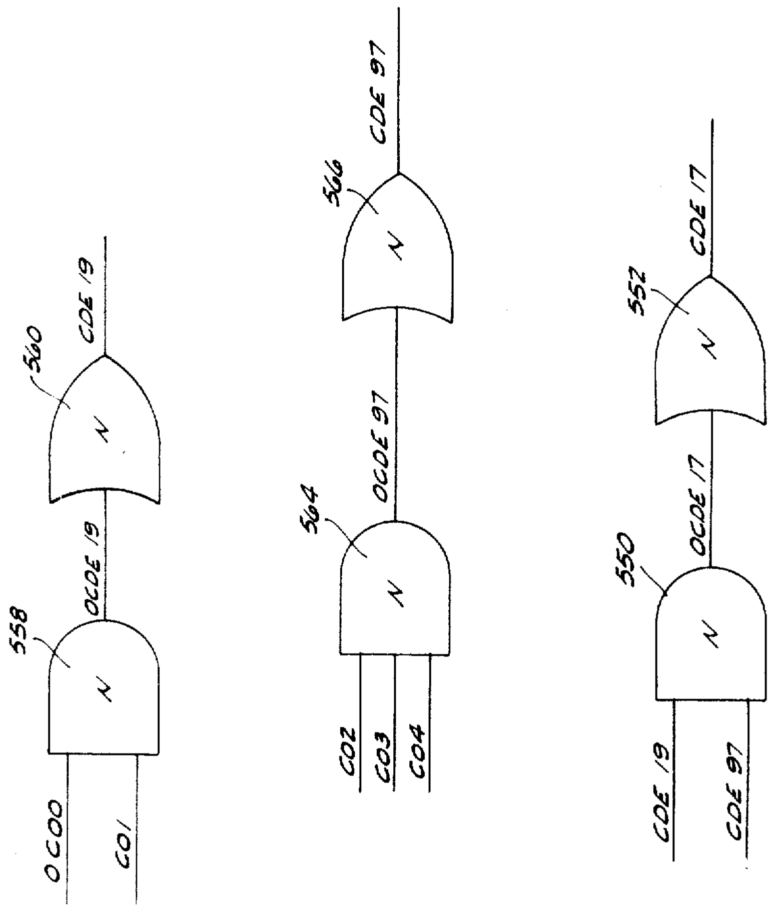
FIG. 27 is a schematic logical diagram showing gates for developing computer external function control signals.

Referring now to FIG. 27, a gating structure for developing a code 17 or CDE17 signal representative of an external function operation includes a NAND gate 550 functioning as an "and" gate in response to signals CDE19 and CDE97 to apply a signal 0CDE17 to a NAND gate 552 functioning as an inverter to develop the signal CDE17. The signal CDE19 may be developed from the first two bits of the C register 40 (FIG. 1) and the signal CDE97 may be developed from the three least significant bits of the C register 40, the combination forming the computer instruction code. To develop the signal CDE19, a NAND gate 558 functioning as an "and" gate in response to signals 0C00 and C01 derived from the instruction code stored in the C register 40 (FIG. 1), applies a signal 0CDE19 through a NAND gate 560 functioning as an inverter to develop the signal CDE19. A NAND gate 564 functioning as an "and" gate responds to the instruction code signals C02, C03 and C04 stored in the command register 40 (FIG. 1) to apply a signal 0CDE97 to a NAND gate 566 which in turn develops the signal CDE97. Thus, an instruction code 01111 in the illustrated computer is decoded as CDE17 and represents an external function request instruction.

Referring now to FIG. 28, the arithmetic unit write timing signal MYC106 as provided by the control network 78 is developed by a NAND gate 553 responding to a signal 0MYC106. A NAND gate 555 functions as an "and" gate in response to a memory read time phase signal PHY102, an arithmetic cycle signal E105 and a write cycle signal E103 to develop the signal 0MYC106. For developing an input-output unit write timing signal MYC107, a NAND gate 557 functions as an "and" gate in response to a memory phase signal PHY102, an input-output cycle signal E104 and a write cycle signal E103 to develop a signal 0MYC107 which is inverted in a NAND gate 559 to form the signal MYC107. The signals MYC106 and MYC107 are developed in the control network 78 and signals MYC206 and MYC207 are developed in the control network 80 by similar gating structure (not shown).

Figure 29:
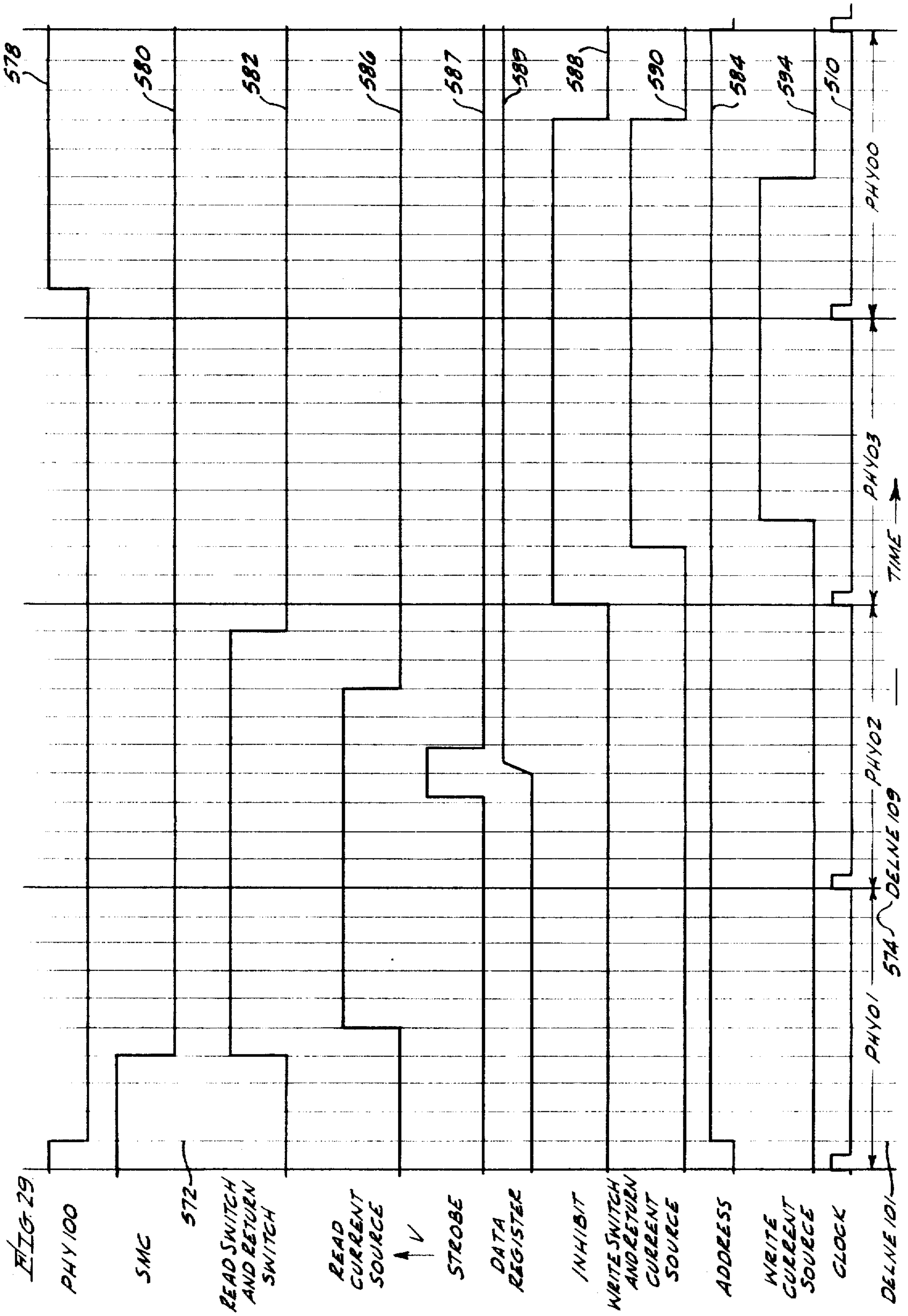
FIG. 29 is a schematic diagram of waveforms of voltage as a function of time for explaining the operation of a memory cycle in the system of FIG. 2.

Referring now to FIG. 29 as well as to FIGS. 3, 4, 5, 11 and 12, the operation of a memory cycle in response to the memory phase counter flip flops E102 and E101 will be explained in further detail. Although the operation will be explained relative to the memory bank 10, it is to be understood that the memory bank 12 functions in a similar manner. The rest state at the end of a memory cycle or PHY00 is developed when the flip flops E101 and E102 are both in the "zero" states. The control input signal to the flip flop E101 is true so that the flip flop E101 is triggered to the true state in response to either a start memory cycle signal SMC going true, a memory module request by the input-output unit granted signal REQ1 going true or the external function word in this module or bank request XTF going true. Thus at the next clock time of a waveform 510 the memory counter changes to state 01 to develop a signal PH101. At the next clock time, the signal E101 is true and 0PHY101 is false to set the flip-flop E102 to the true or "one" state. Because the control input signal to the flip flop E101 is maintained true and all informational input signals are true, the flip flop E101 is reset to the "zero" state at the same clock time. Thus, the memory phase counter is in PHY02 state to develop the signal PHY102. At the next clock time, the signal 0PHY102 is false so that the flip flop E101 is set to the "one" state. Also the signal E101 is false so that the flip flop E102 is maintained in the "one" state. The memory phase counter is thus in the PH03 state and the signal PHY103 is developed at a true level. At the next clock time, the flip flop E101 is reset and the flip flop E102 is reset because the signal E101 and all informational input signals are true. Thus the phase counter is in the rest state and the signal PHY100 of a waveform 578 is developed and maintained until another memory request granted signal SMC, REQ or XTF is provided to a selected memory.

As shown by the waveforms of FIG. 29, clock pulses of the waveform 570 may be developed periodically such as every 0.45 microsecond, for example. The time interval between clock pulses is divided into 10 equal intervals by delay line signals such as DELNE101 and DELNE109 developed by the delay line 50 (FIG. 1) at times indicated by respective vertical lines such as 572 and 574. The four phases of a memory cycle for either memory bank 10 or 12 include PHY00, PHY01, PHY02 and PHY03. The PHY100 signal of the waveform 578 is developed in the gates of FIG. 12 in response to the signals 0E101 and 0E102 being true. A start memory cycle signal SMC of a waveform 580 representing a granted arithmetic request may be applied in an inverted form to the flip flop E101 to change the counter to phase PHY01. The read switches of the read-write switching circuits 94 and 98 and the return switching circuits 96 and 100 are gated in response to a timing signal of a waveform 582 during phases PHY01 and PHY02 in response to the read timing circuit 150. The address of a waveform 584 is applied from the address register 18 to the switching circuits 94, 96, 98 and 100 at the state of phase time PHY01. The read time flip flop circuit 128 (FIG. 3) develops a read timing pulse of a waveform 586 shortly after opening the read and return switches to pass a half amplitude read current pulse substantially coincident in time to the pulse of the waveform 586 through the read-write and return switches and through the cores of the selected word in both the X and Y directions. Thus all of the eighteen cores of the selected word are switched to the "zero" magnetic state or remain thereat to develop a pulse in the sense lines coupled to those cores storing a "one" state. Strobe pulses of a waveform 587 gate the sensed signals into the data register 22 as shown by a waveform 589.

During the write phases PHY03 and PHY00, an inhibit pulse of a waveform 588 is applied from the inhibit timing circuit 188 (FIG. 4) to the inhibit driver circuit 114 (FIG. 4) to respond to a "zero" stored in the data register 22. For writing a "zero" or inhibiting the writing of a "one," inhibit current pulses substantially coincident in time with the pulse of the waveform 588 are applied through inhibit lines such as 91 of FIG. 4 coupled to each bit position of the addressed word position. Shortly after the inhibit pulse of the waveform 588 is developed, a write switching pulse of a waveform 590 is developed by the write timing circuit 164 (FIG. 5) to open write switches in the circuits 94, 96, 98 and 100 as selected by the contents of the address register 18. One delay line time after development of the timing pulse of the waveform 590, a write timing signal of a waveform 594 is applied from the write timing circuit 126 (FIG. 3) to the write current source 110 to pass current pulses substantially coincident in time with the pulse of the waveform 594, through the selected X and Y drive lines in directions to switch all uninhibited cores to "one" states. The operation of each memory cycle continues in a similar manner when initiated by one of the signals 0SMC1, 0REQ1 or 0XTF1.

Figure 30:
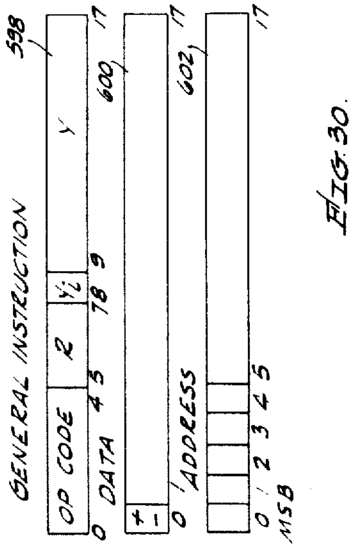
FIG. 30 is a schematic diagram of word and address formats that may be utilized in the system of the invention.

Referring now to FIG. 30 as well as to FIG. 1, the arrangement of the instruction word that may be utilized in the system in accordance with the principles of the invention and shown by a format 598 includes the most significant bits 0 through 4 forming the operating code which is transferred to the command register 40, bits 5 through 7 forming the contents which select an index register and the bits 8 through 17 which form the address of the next operand to be addressed in response to the instruction. As well known in the art, each operating code defines a particular instruction with the code being maintained in the C register 40 while that instruction is performed and until the next instruction word is accessed from memory to transfer a new instruction code to the C register 40. For example, the code 17 controls an external function operation in which the arithmetic unit controls the memory to send the contents of the memory word specified by the instruction word address, to the input-output unit. The operand address may be developed, for example, by adding the Y field to the contents of an index register defined by the R field. The bit *Yi* may specify that the contents of the program counter 38 is added to the Y field to provide the effective operand address. It is to be noted that the principles of the invention are applicable to systems developing the operand address by other arrangements such as by utilizing the 11 bits without modification in the address portion of the operand accessed from memory. A word format 600 shows the arrangement of an operand that may be stored in memory and accessed in response to the address provided by either the arithmetic unit or by the input-output unit. For example, the operand may utilize the most significant bit as the sign bit and the 17 least significant bits as the magnitude of a stored number. An address of a word in any bank supplied to the address register 18 from either the arithmetic unit or from the input-output unit as shown by a format 602 includes bits 5 through 17 or 13 bits. The bit 4 may be utilized as a bank selector when two banks are utilized in the system. When additional banks are provided such as three or four, the bits 3 and 4 may be utilized for bank selection. Also, additional bits may be utilized for bank selection as required by the number of banks utilized in accordance with the principles of the invention.

To further explain the operation of the system of the invention, the PCU phase counter of FIG. 21 is normally maintained in phase with the memory phase counter E101 and E102 (FIG. 11). The flip flop X01 representing the least significant bit is set to the "one" state when 0MYC01 goes false as shown in FIG. 24. In response to 0LEV04 being true to PHA0 being true at the start of a cycle, the signal 0MYC01 is false. Thus, at a first clock time, flip flop X01 is set to the "one" state and the counter changes from state 00 to state 01. If the signal EAU is true indicating that an arithmetic cycle has been granted, the signal PHA1 is developed as shown in FIG. 22. At the next clock time, all of the informational input signals to the flip flop X01 are true so it is reset to a "zero" state. As the signal PHA0 is false at this clock time, the signal 0MYC01 is true as may be seen in FIG. 24. Also at this clock time, the flip flop X02 having a true signal at its control terminal is set to the "one" state in response to the signal 0PHA1 being true. Thus the counter is in state 10 and the signal PHA2 is at a true level. At the next clock time, the flip flop X01 changes to the "one" state in response to the signal 0PHA2 being false and the flip flop X02 maintains its "one" state because the signal X01 is at a false level. Thus, at this clock time, the counter develops the signal PHA3 at a true level. At the next clock time, the flip flop X01 is reset as all of the informational input signals are true and the flip flop X02 is reset as the signal 0PHA1 is true and the control signal X01 is true to develop a true signal PHA0.

As shown in FIG. 22, the signal PHA0 is developed by the gate 462 when EAU is false and the flip flops X02 and X01 are in the 01 states. When EAU is false the signal PHA1 is not developed because of the false signal at the input terminal of the gate 468. As will be explained subsequently, this condition as developed by the gate 462 is utilized to maintain the computer in an inhibited condition with the counter in the state 01. During normal counting, the signal PHA0 is true when 0X01 and 0X02 are true at the gate 450. Thus the signal PHA0 is maintained by signal EAU being false although the PCU counter has changed to the state 01 and is maintained in that condition until an arithmetic memory cycle is granted. The signal PHA1 then goes true when the signals 0X02, X01 and EAU are all true. The signal PHA2 is true when X02 and 0X01 are true or the counter is in the 10 state and the signal PHA3 is true when the signals X01 and X02 are true, that is, the counter flip flops are in the 11 states.

The PCU phase counter X01 and X02 and the memory phase counter E01 and E02 both complete a memory cycle in states 00 and remain in those states until a memory request signal is received either from the arithmetic unit or from the input-output unit. As shown in FIG. 9, an arithmetic request granted signal RAQ1 for bank 10 is developed either in response to an external function request signal XTC or an arithmetic request signal MYC01 when the memory is in the proper phase PHY100 to respond and when that particular bank is addressed as determined by the signal ADR04 in the bank 10, for example. The signal XTC which indicates that an external command is coming to the memory is developed in FIG. 23 in response to a CDE17 signal which is the computer instruction code for an external function command and the LEV04 signal which is a waiting control state of the computer as determined by flip flops X03 to X06. An input-output request granted signal REQ1 for the bank 10 (FIG. 9) or REQ2 for the bank 12 (FIG. 10) is developed in response to an input-output memory access request signal MAR when the memory is ready as determined by the signal PHY100 and at the properly addressed bank as determined by 0LRMAB04 at bank 10, for example. The signal MAR may be provided from the input-output unit or a device such as a tape reader system. The gating arrangement of FIG. 9 provides a priority control to give first priority to an external function request XTC to develop the signal RAQ1 at the true level, as 0CDE17 is applied to the gate 348, second priority to an input-output request MAR as the signal 0REQ1 is applied to the gate 342 and third priority to an arithmetic unit request MYC01. In response to an arithmetic unit request signal MYC01 or an external function request signal XTC, when the signal PHY100 is true, an arithmetic unit request signal RAQ1 gates the address into the address register as shown in FIG. 8. Also in response to the signal 0SMC1 as developed in FIG. 9 at the selected bank, the AU cycle flip flop such as E105 (FIG. 12) is set to the "one" state when the memory is in the rest state or PHY100 state for memory bank 10. The signal 0SMC1 is also applied to the flip flop E101 of the memory phase counter (FIG. 11) which is set to the "one" state to develop the signal PHY101 (FIG. 11). The signal 0MYC01 applied at a false level to the flip flop X01 sets that flip flop to the "one" state and the PHA1 signal is developed. If a memory write cycle is requested by the arithmetic unit, the flip flop E103 (FIG. 13) is set to the "one" state in response to the signal MYC01 being true as may be developed in the gates of FIG. 26. Both the memory phase counter and the PCU phase counter then continued to count through phases two, three and zero. In response to the signal PHY100 the flip flops E103 and E105 will be reset at the last clock period if 0SMC1 is not false, that is, if another arithmetic request is not granted.

When a memory write cycle is requested by the arithmetic unit and the flip flop E103 is set to the "one" state, the information interrogated during the read portion of the cycle is prevented from passing into the data register 22 at gates such as 121 (FIG. 4). Thus E103 is true and in coincidence with the signals PHY102, E103 and E105 being true (FIG. 28) the data is transferred from the B register of the arithmetic unit, for example, to the data register of FIG. 20. If the signal MYC10 is false, a memory read cycle is performed as the flip flop E103 is not set and data on the AU bus is not gated into the data register at PHY102 time (FIG. 28). A "one" state sensed in the memory is applied in the inverted forms 0SAML00 to 0SAML17 to the data register to set the flip flop true for a sensed "one" at read time. During the write portion of the cycle the information in the data register is restored or written back into the addressed word position. As shown in FIG. 17, the contents of the data register are gated in response to E105 being true to the individual leads of the arithmetic unit bus and to the B register. For example, if D100 and E105 are true, BAS00 is true and if D100 is false, BAS00 is false. It is to be noted that the data is available on the AU bus as soon as entered into the data register. If a write cycle has been requested by the arithmetic unit, the information in the data register is also gated to the AU bus but is not utilized by the arithmetic unit.

In response to an external function request XTC (FIG. 23), the arithmetic request signal RAQ1 (or RAQ2 for the bank 12) is developed by the gates of FIGS. 9 and 10. The AU cycle flip flop E105 is not set as this cycle is to be transferred to the input-output unit. The input-output flip flop E104 (FIG. 14) is set to the "one" state in response to the signal 0XTF1 being false, this signal being developed by the gates of FIG. 9. The memory phase counter flip flop E101 is set to the "one" state in response to the signal 0XTF1 and the signal PHY101 or PHY201 is developed depending on the memory bank that is selected by ADR04 (FIGS. 9 and 10). The PCU phase counter flip flops X01 and X02 do not change states.

In response to CDE17 and LEV03 signals being true (FIG. 23), the signal XTC is true and as PHY101 and E104 are true the signal ECC is true as shown in FIG. 16. The signal ECC is applied to the input-output unit for indicating that an external command is coming from the memory at an address selected by the arithmetic unit. The flip flops X01 and X02 do not change states. As shown in FIG. 23, XTC and ECC are true so that the signal 0GTX056 is true to allow the arithmetic unit to proceed with other operations. Also, the signal EAU is false as this is not an arithmetic cycle, that is, the flip flop E105 or E205 has not been set to the "one" state. As EAU is false, the gate 468 or FIG. 22 is not energized as X01 and X02 do not change states so that the signal 0PHA0 is maintained true. The signal MYC10 is not developed in the illustrated system because the data is to be transferred to the input-output unit. The address is transferred to the address register (FIG. 8) in response to the signal RAQ1 or RAQ2. When the flip flop E104 or E204 is set to the "one" state, a data transfer granted signal DTG (FIG. 16) is applied to the input-output unit.

Thus the memory cycle proceeds and the arithmetic unit may proceed in other operations and other memory requests. As shown in FIG. 23, XTC is true so that the arithmetic unit has asked for memory. When ECC goes true during the PHY101 period, the memory request is granted and 0GTXUS6 is true which is a control signal that allows the PCU and arithmetic unit to proceed to other levels or other operations.

At the next clock time after E104 is set to the "one" state, the input-output data switch flip flop E106 (FIG. 14) is set to the true state. Thus as shown in FIG. 18, the information in the data register is transferred to the input-output leads such as BUS00. It is to be noted that because the signal MYC10 is not true, the write memory cycle flip flop E103 is not set to the "one" state so that the interrogated information is gated through the sense amplifiers to the data register as the signals 0SAML100 to 0SAML117. Therefore, the external function request is performed and the arithmetic unit including the program control unit are released to perform other operations or to request other memory cycles.

An input-output memory request which has the second highest priority in each individual memory bank may occur at the same time as an arithmetic cycle request. The input-output request takes priority over an arithmetic request and starts at the end of the current memory cycle if one is in process in the selected bank. As previously discussed, an external function request has priority over both an input-output and an arithmetic request. An input-output request signal MAR is applied from the input-output unit to a gate 348 of FIG. 9 and at the selected bank as determined by the bank selector address LRMAB04 and an input-output request signal REQ1 or REQ2 is developed at a true level. As a result, the memory phase counter flip flop E101 (or E201) is set to the "one" state and the signal PHY101 (or PHY201) is developed. In response to the signal 0REQ1 being false, the input-output flip flop E104 (FIG. 14) is set to the "one" state and the write memory cycle flip flop E103 is set to the "one" state if a memory write request signal MWR is applied to the gate 376 of FIG. 13 from the input-output unit. However, if information is to be only read from the memory, the flip flop E103 is not set due to the absence of the signal MWR at the true level. As shown in FIG. 8, the address register responds to REQ1 and the signals on the input-output line LRMAB05 to LRMAB17 being true for setting an address flip flop to a "one" state and being false for effectively transferring a "zero" to an address register flip flop. The PCU counter of flip flops X01 and X02 is not affected during this input-output request and memory cycle.

At the next clock period after the flip flop E104 is set, the flip flop E106 is set to the "one" state so that data may be transferred to the input-output bus lines during the read portion of the memory cycle by the gating arrangement of FIG. 18. The data is transferred to the input-output bus whether reading or writing is requested. If a write cycle is to be performed, the flip flop E103 (FIG. 13) is set to the "one" state and the signal MYC107 (FIG. 28) is true when the signal PHY101 is true so that data of signals LRMDB00 to LRMDB17 to be written into the memory, are transferred from the input-output leads to the data register or flip flops D100 to D117 (FIG. 20) of the selected bank. The memory phase counter proceeds through the cycle until the signal PH100, when bank 10 is selected for example, is developed.

If an arithmetic unit request signal MYC01 is applied to the memory at the same time that an input-output request signal MAR is applied thereto, a signal RAQ1 or RAQ2 is not developed at the addressed band when the signal PHY100 or PHY200 is true because the signal OREQ1 is applied to the gate 342 of FIG. 9 or to the gate 343 of FIG. 10. If a memory cycle is presently in progress, the signal REQ1 or RAQ1, for example, does not go to a true level until completion of the current memory cycle because the signal PHY100 is applied to the gate 342. It is to be noted that if the addressed banks are different ones, the two banks respond separately to the requests from different sources and simultaneous access to memory is performed. If the two requests, for example, are present with the same bank such as bank 10 being addressed by the bank selector bit, the signal RAQ1 remains false and the flip flop E105 is not set to the "one" state. The flip flop X01 is set to the "one" state but the state 01 of flip flop X02 and X01 is decoded as PHA0 in FIG. 22 as EAU is false. The signal EAU which goes true only when flip flop E105 is set to the "one" state as a result of REQ1 going false, maintains the signal PHA0 true until the input-output cycle is completed. Thus the computer is prevented from proceeding to a subsequent state. As shown in the table of FIG. 31, the flip flop X01 is set to the "one" state and the signal PHA0 is developed as long as the signal EAU remains false and the PCU phase counter is suspended or locked while the input-output cycle or cycles are completed. Because the flip flop X01 is set before the computer system receives an indication that an AU memory request has been granted, the signal EAU is required to lock the PCU phase counter until an AU request is granted. Thus, the memory phase counter and the PCU phase counter are not in phase during three cycles of this operation. At the completion of that higher priority request or requests such as the input-output request, the signal EAU goes true and the AU cycle proceeds from PHA1 with the two phase counters maintained in phase. It is to be again noted that the signals RAQ1 or RAQ2 are only inhibited if the request from the input-output source is for the same memory bank. Also, it is to be noted that when the higher priority external function request is made, the signal RAQ1 or RAQ2 is developed as this is an arithmetic request for transfer of a word to the input-output unit. In the illustrated arrangement, input-output and external function requests or an arithmetic and an input-output request may be simultaneously provided but the arithmetic unit does not simultaneously request an arithmetic and an external function memory cycle. However, the principles of the invention are applicable to any number of memory banks and any number of requesting sources.

Figure 32:
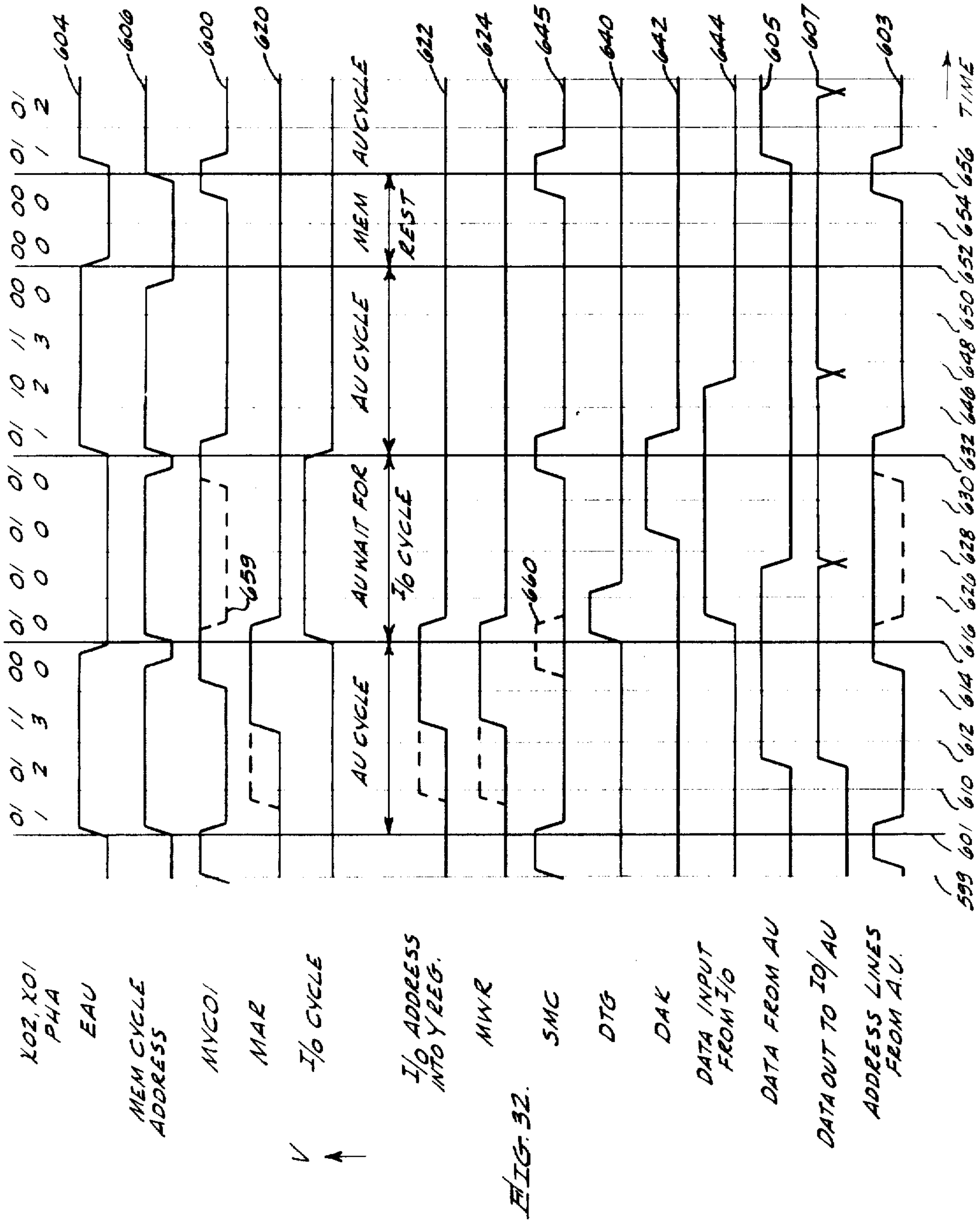
FIG. 32 is a schematic diagram of waveforms showing voltage as a function of time for further explaining the operation of the memory system in accordance with the invention.

Referring now to the waveforms of FIG. 32, the operation of the memory system when responding to arithmetic and input-output requests will be explained in further detail. In response to an AU memory request signal MYC01 of a waveform 600 at a clock time 599, the signal EAU of a waveform 604 goes true at the next clock time 601. At the same time, the flip flops X01 and X02 change to the 01 state and a PHA1 signal is developed. At time 599 the address signal is applied to the address lines as shown by a waveform 603. Also at time 601, a memory cycle is started at a selected address as shown by a waveform 606 indicating the address in the Y register and proceeds through times 610, 612, 614, to be completed at time 616. Also at time 616, the signal EAU of the waveform 604 falls to a false level. At clock time 610, data is transferred from the leads of the AU bus to the data register as shown by a waveform 605. At time 610, the data is transferred from the data register to the AU bus as indicated by the waveform 607. At the clock time 612 or prior thereto, an input-output memory access request signal MAR of a waveform 620 may be received by the selection network from the input-output unit, with an input-output address such as LRMAB04 indicated by a waveform 622 selecting the same bank 10 as the arithmetic unit is presently accessing. Because the selected memory bank is operating in response to a request from the arithmetic unit, the MAR signal and a memory write request signal MWR of a waveform 624 are maintained until the completion of the current memory cycle. At the time 614, another memory request signal MYC01 of the waveform 600 is developed but because of the priority structure of the selection network, an input-output cycle is initiated at the time 616 in response to the signal MAR. At clock times 626, 628, 630 and 632 an input-output cycle is performed while the arithmetic unit waits because the signal RAQ1 remains false. At the time 616, a data transfer grant signal DTG of a waveform 640 is applied to the input-output unit for control thereof. Because the signal MWR of a waveform 621 went true, a data acknowledge signal DAK of a waveform 642 is also developed and sent to the input-output unit at the clock time 628. The data is transferred into the data register at clock time 616 as shown by a waveform 644. At the time 632, the input-output cycle is completed and no further input-output cycles are requested as shown by the MAR signal of the waveform 620 and an AU cycle is initiated in response to the signal MYC01 of the waveform 600. A read cycle may be requested so that data is not transferred into the data register. As shown by the waveform 603, the address is applied to the lines of the AU address bus at clock time 614 and maintained until after clock time 632 to be transferred to the address register as shown by the waveform 606. The AU cycle proceeds through times 646, 648 and 650 and terminates at a time 652. Data is transferred to the leads of the AU bus at clock time 646 as indicated by the waveform 607. It is to be noted that the start memory cycle signal SMC of a waveform 645 is generated at times 599 and 630. The signal EAU indicating that an AU memory request has been granted goes true at time 632 and goes false again at time 652. At the completion of the AU cycle at time 652, no memory request of signals MYC01 or MAR and no external function request is present. Thus during the period following clock times 652 and 654, the memory is in a rest state and the PHA0 signal is developed by the PCU phase counter. At a time shortly after the time 654, a memory request signal MYC01 of the waveform 600 is developed and an AU cycle is initiated at the time 656. The SMC signal of the waveform 645 is developed substantially coincident with the MYC01 signal of the waveform 600 to start the memory cycle and the EAU signal of the waveform 604 goes true at clock time 656. The above operation which illustrates the condition when both an arithmetic unit and an input-output unit request is directed to the same memory bank shows that the arithmetic request is maintained until all input-output requests are performed and that an input-output request is performed as soon as a current arithmetic unit memory cycle is completed.

If different banks are addressed from the arithmetic unit and the input-output unit, the MYC01 signal of the waveform 600 falls at the clock time 616 as shown by a dotted waveform 659 and the signal SMC of the waveform 645 is developed at clock time 614 as shown by a dotted pulse 660. Thus, when different banks are addressed, an arithmetic cycle will be performed in one memory bank while the input-output cycle is performed in the other memory bank without requiring the arithmetic unit to wait for completion of all input-output cycle or other higher priority requests in other banks.

Figure 33:
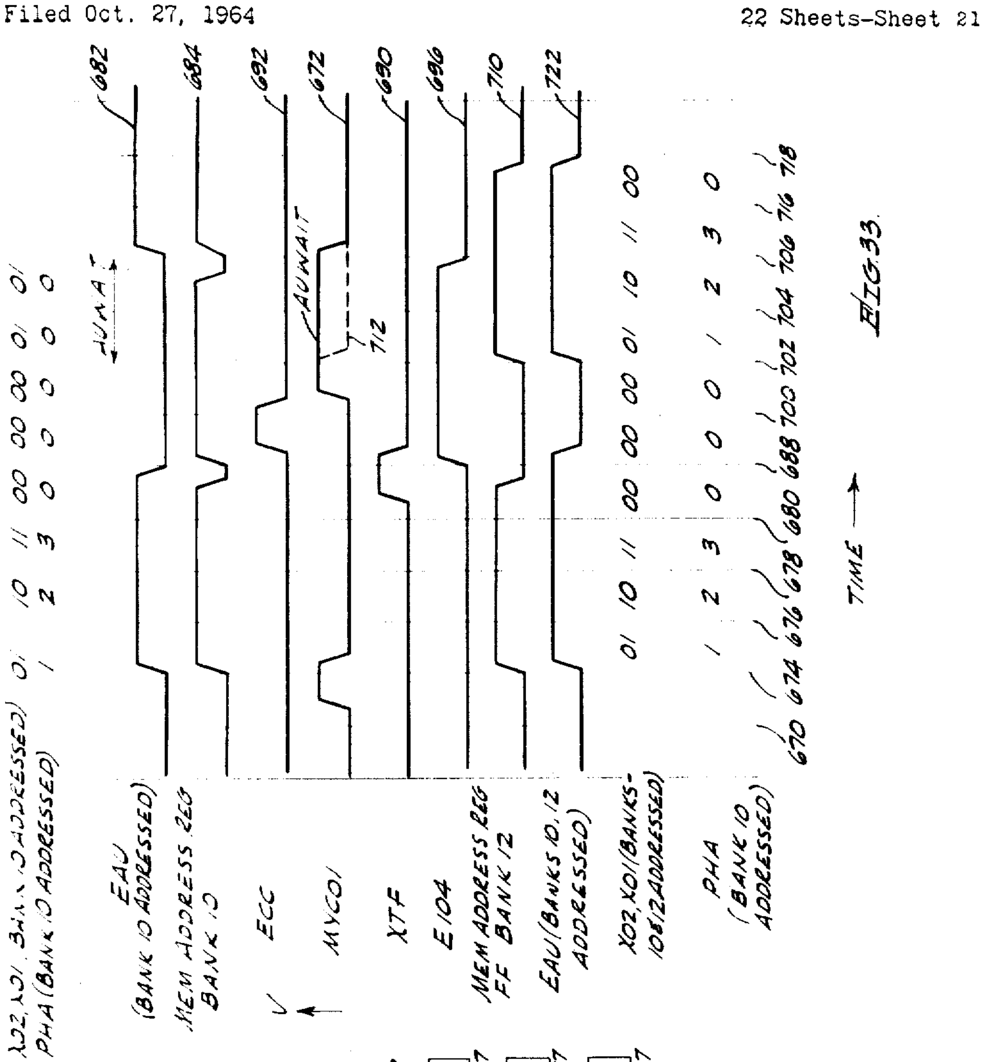
FIG. 33 is a schematic diagram of waveforms showing voltage as a function of time for further explaining the operation of the banked memory system in accordance with the invention.

Referring now to FIG. 33, the operation of the memory system in accordance with the principles of the invention will be further explained when responding to both an arithmetic unit request and an external function request. At time 670, a signal MYC01 of a waveform 672 may initiate an arithmetic unit request during the period starting with clock times 674, 676, 678 and 680. The signal EAU is true as shown by a waveform 682 as well as the memory address in the data register of a waveform 684 indicating the stored word address for bank 10. At clock time 680 an external function signal XTF of a waveform 690 goes to a true level and at time 688 a signal ECC of a waveform 692 is developed and the flip flop E104 is set to the true state as shown by a waveform 696. An external function operation to transfer a word from memory to the input-output unit is performed during clock periods starting with clock times 688, 700, 702 and 704, terminating at clock time 706. Also at a clock time such as 700, an arithmetic request signal MYC01 is developed and maintained while the external function cycle is completed, the same bank being addressed by both the external function request and the arithmetic unit request. It is to be noted that during the period starting with clock times 702 and 704, the PCU phase counter has changed to state 01 and develops the signal PHA0.

If the memory address selects a different bank such as bank 12 as indicated by a waveform 710, another arithmetic unit request MYC01 of the waveform 672 at clock time 700 results in an arithmetic unit cycle starting simultaneous with the operation of the external function cycle in bank 10. Thus the signal MYC01 falls as shown by a dotted waveform 712 and the signal EAU of a waveform 722 is true during clock periods starting with clock times 702, 704, 706 and 716. Thus when different memory banks are addressed from different sources at the same time, the PCU phase counter proceeds through phases PHA1, PHA2, PHA3 and PHA0 while the external function cycle is independently completed at clock time 706. In this operation when separate memory banks are addressed, the signal EAU is true between clock times 702 and 718 as shown by a waveform 722. Therefore, each memory bank responds independently to requests from different sources to perform requested memory cycles with the requirement that each bank may be accessed if the priority conditions and the completion of a current memory cycle condition is satisfied.

Thus, there has been described a banked memory system in accordance with the principles of the invention in which a plurality of memory banks are organized to accept and furnish data to a plurality of independent areas. Each bank or memory module operates independently of the other so that separate memory banks may be simultaneously accessed. Each area requesting accesses to the memory banks operates substantially independently of each other and the memory banks select areas with predetermined priority to provide required feedback signals. The arithmetic unit is controlled by the memory banks to be inhibited from continuing operation when a higher priority memory access request has been made of the same memory bank. When the arithmetic unit requests and receives a memory cycle for the input-output unit, it is then released to perform other operations. When any request is made to a memory bank, a current memory cycle thereof is completed before that request is granted, the request being granted if it is of a higher priority. The addresses supplied in common to all of the banks includes a bank selector portion to which the addressed bank responds. The system of the invention allows any of the plurality of areas to address any bank without control arrangements that require waiting periods for the other areas to complete their operations. The memory system of the invention allows rapid computer operation with a minimum of control circuits.

What is claimed is:

1. A system comprising:

a plurality of substantially independently operating memory banks, a plurality of sources for each requesting access to said plurality of memory banks and applying an address to said plurality of banks, and means in each bank for responding to requests from different sources addressing the same bank at the same time to respond to one request and provide memory access thereto and to inhibit the remaining one or ones of the requesting sources while said memory access is completed, said means responding to requests from different sources addressed to diferent banks to provide simultaneous access to said different banks.

2. A computer memory system comprising:

a plurality of substantially independently operating memory storage banks operating in memory cycles and each including a priority selection network, an address register and a control circuit, a plurality of sources for accessing said memory banks each coupled to the selection network, address register and control circuit of each memory bank, each source developing a memory request signal common to said plurality of banks, an address common to each of said banks and a bank selector address, each of said selection networks responding to a memory request signal and a predetermined bank selector address to gate the common address from the corresponding source to the corresponding address register and provide access to the selected memory bank from that one of said plurality of sources, each of said selection networks responding to similar bank selector addresses and to memory request signals from a plurality of sources prior to a memory cycle to sequentially provide access thereto with a predetermined priority.

3. A computer memory system comprising:

a plurality of substantially independently operating memory banks each including a selection network having a memory request priority circuit and including an address register, a plurality of sources for accessing said memory banks each coupled to the selection network and address register of each memory bank, each source developing a memory request signal common to said plurality of banks, an address common to each of said banks and a bank selector address, each of said selection networks responding to a memory request signal from any of said sources and a predetermined bank selector address to gate the address from the corresponding source to the address register of that bank and provide access to that selected memory bank, said priority circuit responding to memory request signals from more than one of said sources and bank selector addresses for that bank to provide access to that memory bank with a predetermined priority.

4. A system comprising:

an arithmetic unit source and an input-output unit source of memory requests, bank identifier addresses and common addresses, each source operating independently of the other to develop the memory requests and addresses, a plurality of substantially independently operating memory banks each including a priority selection network and an address register, said priority network providing a highest to lowest order of access priority from the input-output unit and from the arithmetic unit, each of said priority selection networks responding to an input-output request and a predetermined bank identifier address to gate the common address from the input-output unit to the address register thereof and responding to an arithmetic unit request and a predetermined bank identifier address to gate the common address from the arithmetic unit source to the address register thereof.

and data means coupled from said arithmetic unit and said input-output unit to said plurality of memory banks for transferring data thereto and for transferring data from a selected bank, whereby each of said banks independently responds to the highest priority request in combination with the bank identifier addresses to transfer data thereto or therefrom.

References Cited

UNITED STATES PATENTS

| | | | |
|---|---|---|---|
| 3,200,380 | 8/1965 | MacDonald et al. | 340—172.5 |
| 3,202,969 | 8/1965 | Dunwell et al. | 340—172.5 |
| 3,231,863 | 1/1966 | Ulfsparre | 340—172.5 |

ROBERT C. BAILEY, *Primary Examiner.*

PAUL J. HENON, *Examiner.*

R. M. RICKERT, *Assistant Examiner.*